United States Patent
Patel et al.

(10) Patent No.: US 11,596,872 B2
(45) Date of Patent: *Mar. 7, 2023

(54) AUTOMATED PLAYER SPONSORSHIP SYSTEM

(71) Applicant: Electronic Arts Inc., Redwood City, CA (US)

(72) Inventors: Jijnes Jashbhai Patel, Hillsborough, NJ (US); Daniel Valentine Gibson, Irvine, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/249,379

(22) Filed: Mar. 1, 2021

(65) Prior Publication Data

US 2021/0213362 A1 Jul. 15, 2021

Related U.S. Application Data

(63) Continuation of application No. 16/370,846, filed on Mar. 29, 2019, now Pat. No. 10,967,277.

(51) Int. Cl.
*A63F 13/79* (2014.01)
*A63F 13/61* (2014.01)
*A63F 13/795* (2014.01)

(52) U.S. Cl.
CPC ............ *A63F 13/795* (2014.09); *A63F 13/61* (2014.09); *A63F 2300/5566* (2013.01)

(58) Field of Classification Search
CPC ..... G07F 17/323; G07F 17/32; G07F 17/3227
See application file for complete search history.

(56) References Cited

U.S. PATENT DOCUMENTS

| | | | |
|---|---|---|---|
| 10,967,277 B2 | 4/2021 | Patel et al. | |
| 2007/0191104 A1* | 8/2007 | Van Luchene | G07F 17/32 463/42 |
| 2008/0032787 A1* | 2/2008 | Low | G07F 17/323 463/29 |
| 2013/0184071 A1* | 7/2013 | Gadher | G07F 17/3227 463/29 |
| 2013/0231999 A1 | 9/2013 | Emrich et al. | |
| 2014/0274384 A1 | 9/2014 | Boswell et al. | |
| 2014/0274413 A1 | 9/2014 | Chelst | |
| 2018/0001216 A1 | 1/2018 | Bruzzo | |
| 2019/0378369 A1* | 12/2019 | Washington | G07F 17/3246 |
| 2020/0306631 A1 | 10/2020 | Karlsson | |

FOREIGN PATENT DOCUMENTS

| CN | 202010231381X | 11/2021 |
|---|---|---|
| KR | 10-1626440 | 6/2016 |

* cited by examiner

*Primary Examiner* — Saba Dagnew
(74) *Attorney, Agent, or Firm* — Knobbe Martens Olson & Bear LLP

(57) ABSTRACT

Embodiments of the systems and methods disclosed herein provide a sponsor matching system in which players and sponsors can be matched. Upon a match based at least in part on stored sponsorship criteria and/or player preferences, a first sponsor can select a set of players to receive permission to select an advertisement associated with the first sponsor. Once a first player of the selected players selects an advertisement and an advertisement placement location associated with the first sponsor, the sponsor matching system can generate game rendering instructions for a first player system associated with the first player.

20 Claims, 10 Drawing Sheets

AUTOMATED PLAYER SPONSORSHIP SYSTEM

INCORPORATION BY REFERENCE TO ANY PRIORITY APPLICATIONS

This application is a continuation of U.S. patent application Ser. No. 16/370,846, filed Mar. 29, 2019, the entire contents of which are hereby expressly incorporated by reference herein in its entirety and for all purposes. In addition, any and all applications for which a domestic priority claim is identified in the application data sheet as filed with the present application are also hereby incorporated by reference under 37 CFR 1.57.

BACKGROUND OF THE INVENTION

Video games have increased in popularity and complexity in recent years. There are a number of websites and resources dedicated to competition among video game players. Some users record videos of gameplay using game applications. The gameplay videos can be shared with other users to show different aspects of gameplay, illustrate user events, completion of difficult tasks, achievements, or other types of events within a game application. The videos can be shared on video upload sites for other users to view or streamed for people to view. Some users engage in competitions and provide videos for showing completion of a specific gameplay aspect, such as the quickest completion time of a video game level, or other types of events.

Additionally, companies that want to invest or sponsor a particular type of player may not know what player meets their criteria or even how to find such a player. Also, once a player is located, there are very limited ways for sponsors to advertise in a location on the player's stream or video.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment discloses a sponsor matching system comprising: one or more data stores configured to store: sponsorship criteria associated with one or more sponsor accounts, wherein the one or more sponsor accounts includes a first sponsor account associated with a first sponsor; and player data associated with one or more player accounts, wherein the one or more player accounts includes a first player account; and network interface configured to communicate with one or more player systems and one or more sponsor systems; and one or more physical computer processors in communication with the one or more data stores, wherein the computer-executable instructions, when executed, configure the one or more physical computer processors to: receive player data from a plurality of player systems associated with a plurality of player accounts; receive a first sponsorship request from a first sponsor system, wherein the first sponsorship request includes first sponsorship criteria and is associated with the first sponsor account; apply a sponsorship and player matching model to identify a first subset of player accounts, and wherein the identification is based at least in part on the player data and the first sponsorship criteria; select the players in the first subset of player accounts to receive sponsorship data associated with sponsorship of the player account by the first sponsor account; and transmit first sponsorship data to a first player account, wherein the first sponsorship data includes virtual sponsorship content identifying the first sponsor for display within a virtual environment of a first game application.

Various embodiments of the system may include one, all, or any combination of the following features. In some embodiments, the virtual sponsorship content includes advertisement customizations that are based at least in part on advertisement placement locations for the first sponsor. In some embodiments, advertisement placement locations for each of the selected sponsors includes locations on an interface or object to be rendered on an interface during gameplay within the game application. In some embodiments, the one or more physical computer processors are further configured to: receive feedback data from one or more of: a sponsor system, a player system, and an administrator of the sponsor matching system; and generate the sponsorship and player matching model that can be used to match sponsors with players based at least in part on sponsorship criteria and player data. In some embodiments, the one or more physical computer processors are further configured to: receive updated player data from the first player system; and apply the sponsorship and player matching model to the updated player data based on the first sponsorship criteria to: determine a second subset of player accounts based at least in part on the first sponsorship criteria and the updated player data. In some embodiments, the one or more physical computer processors are further configured to: determine a second subset of player accounts comprising a recommended set of players based at least in part on the first sponsorship criteria and the player data, wherein the second subset of player accounts is flagged for a secondary approval by the first sponsor system. In some embodiments, the one or more physical computer processors are further configured to: receive, from the first sponsor system, updated sponsorship criteria; and wherein the first sponsorship criteria includes updated sponsorship criteria. In some embodiments, the sponsorship and player matching model is a supervised machine learning algorithm. In some embodiments, the player data includes player preferences associated with the one or more player accounts. In some embodiments, the one or more physical computer processors are further configured to: automatically approve the players in the first subset of player accounts to receive sponsorship data associated with the first sponsor. In some embodiments, the one or more physical computer processors are further configured to: transmit, to the first sponsor account, a request for approval of the first subset of players accounts to receive sponsorship data; and receive, from the sponsor system, selected player information indicating a selection of players from the first subset of player accounts to receive sponsorship data.

In another embodiment, a computer implemented method comprising: by one or more physical computer processors in communication with the one or more data stores, receiving player data from a plurality of player systems associated with a plurality of player accounts; receiving a first sponsorship request from a first sponsor system, wherein the first sponsorship request includes first sponsorship criteria and is associated with a first sponsor account; applying a sponsorship and player matching model to identify a first subset of player accounts, and wherein the identification is based at least in part on player data and first sponsorship criteria; selecting the players in the first subset of player accounts to receive sponsorship data associated with sponsorship of the player account by the first sponsor account; and transmitting first sponsorship data to a first player account, wherein the first sponsorship data includes virtual sponsorship content identifying the first sponsor for display within a virtual environment of a first game application.

Various embodiments of the system may include one, all, or any combination of the following features. In some embodiments, the virtual sponsorship content includes advertisement customizations that are based at least in part on advertisement placement locations for the first sponsor. In some embodiments, advertisement placement locations for each of the selected sponsors includes locations on an interface or object to be rendered on an interface during gameplay within the game application. In some embodiments, the method further comprises receiving feedback data from one or more of: a sponsor system, a player system, and an administrator of the sponsor matching system; and generating the sponsorship and player matching model that can be used to match sponsors with players based at least in part on sponsorship criteria and player data. In some embodiments, the method further comprises receiving updated player data from the first player system; and applying the sponsorship and player matching model to the updated player data based on the first sponsorship criteria to: determine a second subset of player accounts based at least in part on the first sponsorship criteria and the updated player data. In some embodiments, the method further comprises determining a second subset of player accounts comprising a recommended set of players based at least in part on the first sponsorship criteria and the player data, wherein the second subset of player accounts is flagged for a secondary approval by the first sponsor system. In some embodiments, the player data includes player preferences associated with the one or more player accounts. In some embodiments, the method further comprises automatically approving the players in the first subset of player accounts to receive sponsorship data associated with the first sponsor. In some embodiments, the method further comprises transmitting, to the first sponsor account, a request for approval of the first subset of players accounts to receive sponsorship data; and receiving, from the sponsor system, selected player information indicating a selection of players from the first subset of player accounts to receive sponsorship data.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
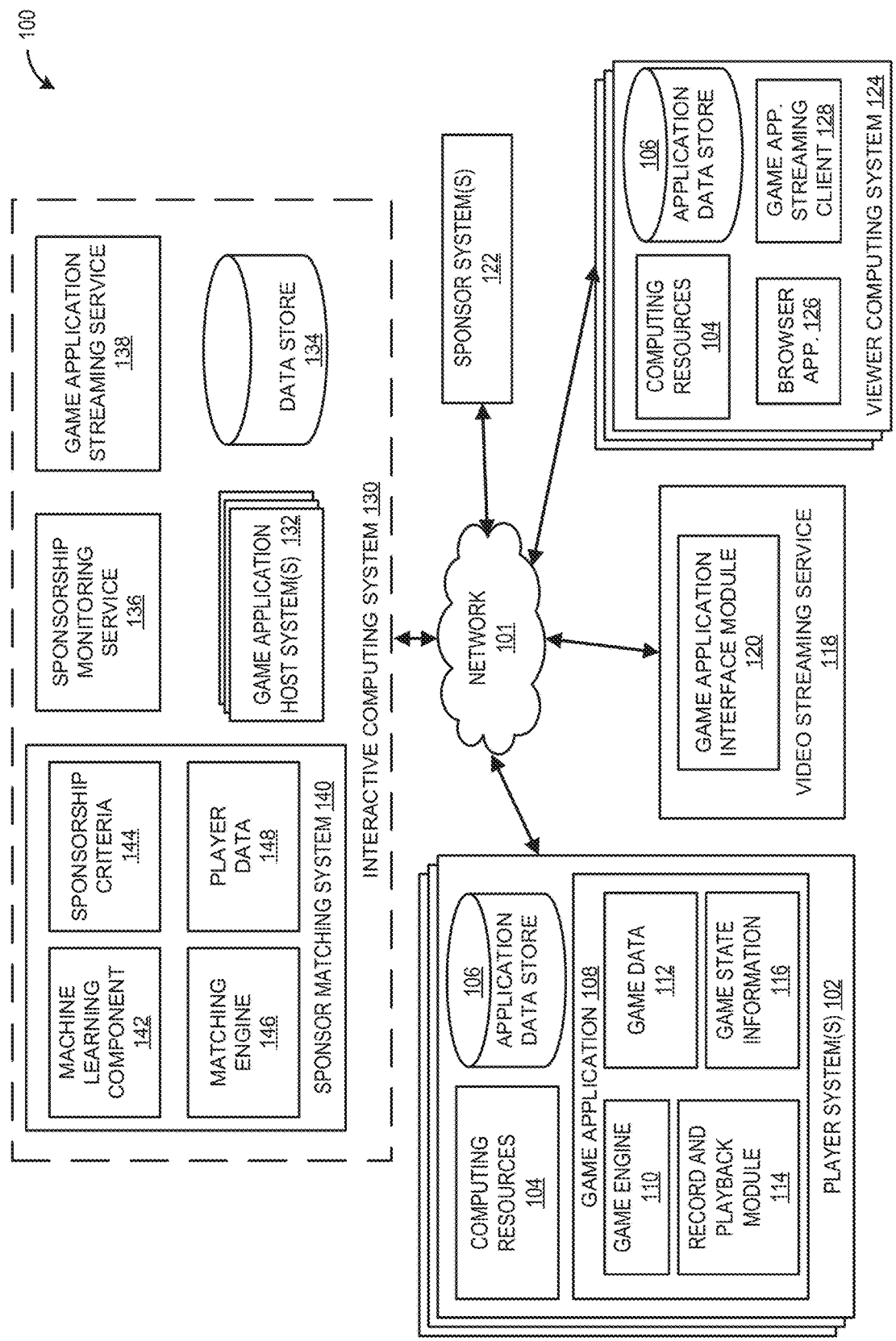
FIG. 1 illustrates an embodiment of a networked computing environment including an automated sponsorship system.

There are a number of websites and resources dedicated to competition among video game players. Some users record videos of gameplay using game applications. The gameplay videos can be shared with other users to show different aspects of gameplay, illustrate user events, completion of difficult tasks, achievements, or other types of events within a game application. The videos can be shared on video upload sites for other users to view or streamed for people to view. Some users engage in competitions and provide videos for showing completion of a specific gameplay aspect, such as the quickest completion time of a video game level, or other types of events.

Additionally, companies may want to invest or sponsor a particular type of player, but may not know what player meets their criteria or even how to find such a player. For example, a sponsor may look at a popular streaming service (for example, Twitch, or the like) or at uploaded videos on a video upload site (for example, Facebook, YouTube, or the like) to find popular videos uploaded by particular players of a particular game. Some solutions to such problems, for example, can include monitoring user gameplay data and other related data to analyze and determine whether players meet the preconfigured sponsorship criteria. The analysis can include the use of artificial intelligence or machine learning as described herein, for example.

Also, once a player is located, there are limited ways for sponsors to advertise in a location on the player's stream or video. A solution to such problems can include rendering gameplay content with the advertising content together such that the advertising content is displayed along with the gameplay content during runtime of the video game, so that both are viewable at the same time.

Also, as mentioned, once a player is located, there are limited ways for sponsors to advertise in a location on the player's stream or video. For example, one solution to such problems can include advertising as an overlay on a portion of a virtual object within the game. For example, a virtual character, such as a player's avatar, can have an image associated with a sponsor can be overlaid onto all or a portion of the player's avatar. In another example, a certain location on the screen can include the overlay (for example, a location in the top right corner of the rendered interface).

The image, or advertisement, placed on the rendered video content can have a transparency value associated with it. For example, the image can be less than 100% opaque depending on one or more user preferences, sponsorship criteria, and/or the rendered video content. The image can also have a color scheme associated with it. For example, the image can be limited to black and white, grayscale, color, or a set range of colors. In some embodiments, the color can be based on one or more user preferences, sponsorship criteria, and/or the rendered video content. The color and transparency can also be adjusted automatically, for example, by a machine learning component that monitors and analyzes the player's bandwidth, rendering capabilities (for example, computer hardware or computing resources available via the hardware), rendered images, framerate, or other network or computer characteristics or limitations.

A sponsor can provide sponsorship criteria to a sponsor matching system. The sponsorship criteria can identify the type(s) of players of a particular game or games the sponsor would like to select for sponsorship. The sponsor matching system can use the sponsorship criteria to determine what players of a particular game or games meet the sponsorship criteria and recommend the players to the sponsor. The determination can be based on an analysis of the player system, monitored player game data, or any other information indicated as preferred by the sponsor. In some embodiments, the sponsor matching system can use the monitored player game data, or player data, to predict, using artificial intelligence (AI) or machine learning, and/or additional statistics for the player(s) that are related to the sponsorship criteria. Based on the prediction, the sponsor matching system can then recommend to the sponsor system players that may meet some of the sponsorship criteria and not others, or that may meet the criteria within a threshold amount of time. Such a configuration may be desirable to a sponsor because the sponsor may be able to achieve more recognition at a better rate than if the sponsor chooses to sponsor a player that is a rising star, that has not yet received many other sponsorship offers.

A sponsor can send a request to a sponsor matching system along with sponsorship criteria requesting a list of players that meet the criteria for a sponsorship. The sponsor matching system can monitor gameplay data from multiple players playing the game and keep the data and analytics associated with such data in a data store. Once the request is received by the sponsor matching system, the sponsor matching system can match players to the sponsor based on the sponsorship criteria, player data, and/or any player preferences. For example, the player preferences can indicate the type of sponsor the player would or would not accept. For example, the player preferences may indicate where on the rendered video the player would or would not accept sponsorship advertisement. The player preferences for a particular player, for instance, can indicate that the player would only allow advertisements in the top right corner of the rendered video. Thus, assuming the player data of the player matches the sponsorship criteria, only sponsors that have the top right corner of the rendered video indicated as a potential sponsorship location option would be matched with the particular player.

Once a match is made between a sponsor and one or more players, the sponsor system can present the player(s) to the sponsor for selection. Once, a selection is received by the sponsor, it can transmit the selection to the sponsor matching system, which can then transmit sponsoring options to the player system. In some embodiments, the sponsor matching system may automatically select an identified player for sponsorship without presenting the identified players and receiving a confirmatory selection from the sponsor. The sponsoring options can include one or more sponsors, potential interface locations (for example, on the avatar or a particular location on the rendered video content) to include an image or advertisement for each of the one or more sponsors, and values associated with each sponsor and location. The player system can include a sponsor interface that is configured to allow the player to select an advertisement or sponsor for placement within the game user interface or on an avatar location.

In some embodiments, the sponsor matching system can update the sponsorship options and recommendations in real-time, daily, weekly, monthly, bi-monthly, or the like based on updates to player data and sponsor data. As a particular game is played by players, ranking and other player data is updated, and updated player data can be relevant and important to determine accurate sponsorship options and recommendations. Additionally, in some embodiments, the sponsor system can receive updated sponsor data, such as sponsorship criteria and a new request for a list of players that meet the sponsorship criteria.

Embodiments presented herein use machine learning algorithms in various implementations. Systems presented herein can use a parameter function or a prediction model to predict or estimate sponsorship criteria, player preferences, and/or improved matching, for example. In some embodiments, historical player preferences or historical sponsorship criteria is fed into a machine learning system to generate a prediction model that predicts better matches. For example, during a matching process, the prediction model can be applied to information about a player and other players who are matched with a sponsor. The system may determine which players to select for sponsorships based on the prediction model.

Automated Sponsorship System

FIG. 1 illustrates embodiment 100 of a networked computing environment for implementing an automated sponsorship system. The computing environment may include an interactive computing system 130 for implementing a sponsor matching system 140 and other various systems. The networked computing environment 100 can include one or more viewer computing systems 124, one or more interactive computing systems 130, one or more player systems 102, one or more sponsor systems 122, a video streaming service 118, and one or more sponsor matching systems 140. The viewer computing systems 124 may communicate via a network 101 with the interactive computing system 130 and video streaming service 118. Although only one network 101 is illustrated, multiple networks 101 may exist. The components described herein are not meant to be exhaustive but only a sample of what components may be implemented. Some components may be combined and others may be removed or substituted with similar components.

A. Interactive Computing System

The interactive computing system 130 may include a sponsor matching system 140, a sponsorship monitoring service 136, and a data store 134. The interactive computing system 130 may communicate with the player system(s) 102 and sponsor system(s) 122 over a network 101. In some embodiments, the data store 134 can store matching data 146, player data 148 (such as, player game data or player gameplay data, or player preferences), sponsorship options and recommendations, sponsorship criteria 144, sponsor selections, player selections, or the like.

In some embodiments, the interactive computing system 130 can comprise multiple systems connected via a local area network or via the Internet. Also, in some embodiments the interactive computing system 130, or portions thereof, can be located on the sponsor system(s) 122 and/or player system(s) 102.

The interactive computing system 130 may include one or more computing systems associated with the game application 108. Further, the interactive computing system 130 may include one or more game application host systems 132 enabling multiple users to access a portion of the application. In some embodiments, the game application host systems 132 can be configured to execute at least a portion of a game application 108 executing on a player computing system. In some embodiments, a game application host system 132 can host and maintain a data store 134 configured to store information associated with the game application host systems 132 and the interactive computing system 130. The data store 134 can include gameplay videos associated with a plurality of game applications 108. In some embodiments, the interactive computing system 130 may include a game application streaming service 138. The interactive computing system can interface with the broadcast computing system, viewer computing systems 124, player system 102, and video streaming service 118 to implement various aspects of the automated sponsorship system.

1. Game Application Streaming Service

The game application streaming service 138 can be configured to communicate with the interactive game application client 128 in order to execute game applications using computing resources local to a game application steaming service. The game application streaming service 138 can be configured to communicate information to the interactive game application client 128 for the operation and output of a game application 108 being executed by the game streaming service 118. The client (such as viewer computing system 124) of the game application streaming service 138 can interactively play the game application 108 on the client's computing system as if it were operating locally. The game streaming service can receive user input provided by the viewer computing system 124 through game streaming client to control operation of the game application 108. For example, a game application 108 loaded on the game application streaming service 138 can be output on the viewer computing system and the game application 108 can be controlled based on user inputs received from the viewer computing system 124.

The game application streaming service can be implemented based on the embodiments of an game application streaming services disclosed in U.S. patent application Ser. No. 16/370,707, entitled "Dynamic Streaming Video Game Client", U.S. patent application Ser. No. 15/199,827, entitled "Interactive Gameplay Playback System", and U.S. Patent Publication No. 2014/0274384, entitled "Delivering and Consuming Interactive Video Gaming Content," which are herein incorporated by reference in their entirety.

The game streaming service 138 can operate independently of the game application host system 132 and data store 134. The game streaming service can execute the game application 108 as described with reference to the player computing system 102 and viewer computing system 124.

2. Game Application Host System(s)

The game application host system 132 may be configured to execute a portion of a game application 108 operating on the player system 102. The application host systems 132 may execute another application instead of or in addition to executing a portion of the game application 108 and/or a host application, which may complement and/or interact with the game application 108 during execution of a gameplay session of the game application 108.

In some embodiments, the interactive computing system 130 may enable multiple players or computing systems to access a portion of the game application 108 and/or a host application. In some embodiments, the portion of the game application 108 executed by application host systems 132 of the interactive computing system 130 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 130. A set of users may be assigned to or may access one instance of the persistent virtual world while another set of users may be assigned to or may access another instance of the persistent virtual world.

In some embodiments, the application host systems 132 may execute a hosting system for executing various aspects of a game environment. For example, in one embodiment, the game application 108 may be a competitive game, such as a first person shooter or sports game, and the application host systems 132 can provide a dedicated hosting service for hosting multiplayer game instances or facilitate the creation of game instances hosted by user computing devices. In some embodiments, the application host systems 132 can provide a lobby or other environment for users to virtually interact with one another. In some embodiments, the virtual environments may be populated with one or more virtual characters, objects, features generated by sponsor matching system 140, and/or features generated by the sponsorship monitoring service 136, as well as one or more characters, objects, and/or features designed by a game developer.

3. Data Store

The data store 134 may comprise media content, or sponsor content, associated with advertisements from sponsors. For example, sponsor content can include images, animations, or videos associated with one or more sponsors. The sponsor content can be uploaded or provided for by the sponsor system 122, or can be accessed or retrieved from a third party data store (for example, URL location provided by a sponsor), or accessed from publically available information on the internet, for example. The data store may be updated at to include up-to-date sponsor content. This may be an automated process, in which data store 134 can automatically update sponsor content when it is available.

4. Sponsor Matching System

The sponsor matching system 140 may comprise sponsorship criteria 144, player data 148, a machine learning component 142, and a matching engine 146. The components of the sponsor matching system 140 can be communicated with directly (for example, through an API or other call) or through other components indirectly. For example, a call can be made to the sponsorship monitoring service 136 that then pulls data stored on the data store 136 and the data store 134 to be used in preparing requested display generation instructions. The sponsor matching system 140 can communicate with data store 134 and/or with the application host systems 132 to acquire data associated with a game application 108 and to provide custom character data for use in a game application 108. The sponsor matching system 140 can additionally or alternatively communicate with player system(s) 102, sponsor system(s) 122, and/or one or more third party sources through the network 101.

In some embodiments, the sponsor matching system 140 (or one or more aspects of the sponsor matching system 140)

can include, or be implemented in, a "virtual computing environment." As used herein, the term "virtual computing environment" should be construed broadly to include, for example, computer readable program instructions executed by one or more processors to implement one or more aspects of the modules, engines, and/or functionality described herein. Further, in this implementation, one or more modules or engines (e.g., input engine 132, output engine 108, sponsorship monitoring service 136, and/or matching engine 110) of the sponsor matching system 140 may be understood as comprising one or more rules engines of the virtual computing environment that, in response to inputs received by the virtual computing environment, execute rules and/or other program instructions to modify operation of the virtual computing environment. For example, a request received from the player system(s) 102 may be understood as modifying operation of the virtual computing environment to cause the matching engine 146 to match players to sponsors, the sponsorship monitoring service 136 to generate instructions on how to render a video associated with a game, and to transmit the generated instructions to the player system(s) 102, for example. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered from the data store 136. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the sponsor matching system 140 as a virtual computing environment may advantageously enable executing different aspects or modules of the system on different computing devices or processors, which may increase the scalability of the system. Implementing one or more aspects of the sponsor matching system 140 as a virtual computing environment may further advantageously enable sandboxing various aspects, data, or modules of the system from one another, which may increase security of the system by preventing, e.g., malicious intrusion into the system from spreading. Implementing one or more aspects of the sponsor matching system 140 as a virtual computing environment may further advantageously enable parallel execution of various aspects or modules of the system, which may increase the scalability of the system. Implementing one or more aspects of the sponsor matching system 140 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

a. Sponsorship Criteria

Sponsorship criteria 144 can be provided by sponsor systems 122 to the sponsor matching system 140. The sponsorship criteria 144 can indicate types of players of a particular game or games a sponsor would like to select for sponsorship. The sponsorship criteria may include specific metrics or thresholds, such an identification of games or types of games that are played, a player ranking, average playtime, social media/game streaming statistics (e.g., number of followers, average viewers, and the like), and/or other explicitly designated criteria. The sponsorship criteria may include a selection of sponsorship options that are generated by the sponsor matching system 140. The sponsor matching system 140 may provide categories that define general characteristics of players that can be selected by the sponsor. For example, categories may include rising stars, charismatic, influencer, competitive, enjoyable to watch, funny, product pusher, or other groupings that do not have metrics that readily define a player grouping. The sponsor may be able to choose one or more of the categories. The categories may be generated using the machine learning component. The sponsorship criteria 144 can include information about the particular sponsor itself. For example, provided information about the sponsors business, financials, goals, or the company itself can be included in the sponsorship criteria 144. In some embodiments, publically available information that can be retrieved from publically accessible sources can also be included in the sponsorship criteria. Additionally, in some embodiments, sponsorship criteria can include rules or restrictions that can specify how a sponsor interacts with other sponsors (e.g., sponsors that cannot be displayed with the sponsor). The sponsorship criteria 144 can identify the criteria for earning rewards from a sponsor. The reward criteria can include instructions on how to distribute rewards to particular players. Rewards can be earned and/or automatically distributed based on various gameplay and social media metrics, such as number of viewers, time playing the game, clicks on advertisement (for example, in some embodiments, a viewer can select a location on a streamed video of a player gameplay that corresponds with the location of the advertisement associated with a sponsor to navigate to a website associate with the sponsor), and/or other trackable metrics. In some embodiments, the sponsor matching system 140 can be used as the intermediary to transfer the compensation and/or stream or video of the player's gameplay. In some embodiments, the player can earn virtual currency by fulfilling the reward criteria. The virtual currency may be specific to the sponsor (for example, the virtual currency could be redeemed for the sponsors merchandise), may be virtual currency used within the game applications that the player is playing, or another type of virtual currency.

b. Player Data

The player data 148 may include data associated with a player account. The player account may include gameplay data from gameplay session of one or more games. The player data may include analytics that can be tracked from the player system 102, or from the interactive computing system 130. The player data may include in-game telemetry data, social media data, and/or other data associated with a player's gameplay session(s). In-game telemetry data may include data gathered by the game application during a gameplay session such as, length of play session, the amount of time an advertisement was displayed during a gameplay session, what advertisement was placed achievements earned by the player, the location of the advertisement placement, and/or other types of telemetric data recorded during a gameplay session. Social media data may include data associated with social media sites and applications (such as, Twitch, YouTube, Twitter, Facebook, and the like) that are associated with a gameplay session, such as how many viewers watched the player's game stream, the number of comments generated, the number of stream subscribers, number of views of a prerecorded video (e.g., a YouTube video), number shares, number of likes, and/or other social metrics associated with the gameplay session.

The player data 148 may also include various customizations or preferences of a player associated with a player system 102, which may indicate preferences for implementing sponsor advertising on the player system. For example, player data 148 may include player preferences that indicate what types of sponsors the player is willing to accept. The player data 148 and/or sponsorship criteria 144 can comprise various customizations or preferences on how players prefer to incorporate sponsor advertisement on a particular rendered video corresponding to a game. For example, a first player system may have different sponsorship options available than a second player system, if any sponsorship options are available.

In some embodiments, the player preferences can be based on the game mode, default settings, time, location, or the like. Player data 148 can also include technical specifications of the player system(s) 102. The player data 148 may be stored in the data store 134.

c. Matching Engine

The matching engine 146 can match players with sponsors. The matching engine can identify players of a particular game or games the meet the sponsorship criteria 144 of one or more sponsors. The identification of players can be based on the sponsorship criteria 144, player data 148, matching models generated by the machine learning component, defined rules or matching algorithms, and/or other matching criteria.

In some embodiments, the matching engine 146 can use one or more prediction models, generated using artificial intelligence (AI) or machine learning, to determine additional statistics for player(s) that are related to the sponsorship criteria. Based on the prediction, the computing system 140 can then identify players that may meet the sponsorship criteria in the future within a threshold amount of time or may meet criteria that is not explicitly defined within the sponsorship criteria. Such a configuration may be desirable to a sponsor because the sponsor may be able to identify players before a player becomes popular.

The results of matches or predicted matches determined by the matching engine 146 can be generated using some or all of player data 148 and/or sponsorship criteria 144 that may be pertinent to matching sponsors with players. The matching engine 146 can be configured to identify groups of players in particular categories. For example, categories can include top 10% of players, rising stars (for example, players that increase their player ranking score relative to other players a certain amount in a certain time period), players based on their gender, a combination of categories, or the like. The matching engine can also generate recommendations, sponsor selections, player selections, or the like.

d. Machine Learning Component

A machine learning component 142 can be used to assist the sponsor matching system 140 in matching sponsors with players and to analyze player data 148 to determine additional or updated groupings of players into previously generated categories or newly created categories. The machine learning component 142 can use one or more machine learning algorithms to generate one or more prediction models or parameter functions for the categories. The categories can define general characteristics of players that can be selected by the sponsor. For example, categories may include rising stars, charismatic, influencer, competitive, enjoyable to watch, funny, product pusher, or other groupings that do not have metrics that readily define a player grouping. The machine learning component can be configured to generate models that identify players within each category and/or a combination of one or more categories. One or more of these prediction models may be used to determine an expected value or occurrence based on a set of inputs.

For example, the machine learning component 142 can implement machine learning algorithms or AI to generate matching models that are executed by the matching engine 146. The machine learning models can be used to identify players and match the players with sponsors based on existing player data 148 and/or sponsorship criteria 144. Predictions can include players that do not meet the explicitly defined sponsorship criteria 144 but might meet the sponsorship criteria 144 in the future. In some embodiments, for example, there may be new categories that identify players based on the machine learning models (for example, a rising stars category).

A number of different types of algorithms may be used by the machine learning component 142 to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component 142. For example, the models can be regenerated on a periodic basis as new player information is available to help keep the predictions in the model more accurate as the player information evolves over time. The machine learning component 142 is described in more detail herein.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of player interaction data may be analyzed to generate models.

5. Sponsorship Monitoring Service

The sponsorship monitoring service 136 can monitor the usage of the sponsorship content by a player. The sponsorship monitoring service 136 can monitor data associated with the sponsorship content to determine allocation of reward content to the players. The monitored data may include in-game telemetry data, social media data, and/or other data associated with a player's gameplay session(s). In-game telemetry data may include data gathered by the game application during a gameplay session such as, length of play session, the amount of time an advertisement was displayed during a gameplay session, what advertisement was placed, achievements earned by the player, the location of the advertisement placement, and/or other types of telemetric data recorded during a gameplay session. Social media data may include data associated with social media sites and applications (such as, Twitch, YouTube, Twitter, Facebook, and the like) that are associated with a gameplay session, such as how many viewers watched the player's game stream, the number of comments generated, the number of stream subscribers, number of views of a prerecorded video (e.g., a YouTube video), number shares, number of likes, and/or other social metrics associated with the gameplay session.

In some embodiments, the sponsorship monitoring service 136 may be configured to generate a report of the monitored data and provide the report to the sponsors. The sponsorship monitoring service 136 may be configured to provide a network-based interface that is accessible by the sponsor systems, such as the same interface system used by a sponsor system to request a sponsorship, in order to access and monitor sponsored players. For example, a sponsor may be able to view statistics associated with the sponsored players, videos of the player's gameplay sessions, links to social media information, and access to other types data related to the sponsored players.

B. Player System(s)

In some embodiments, the player system(s) 102 can be controlled by a player of a video game. The player system(s) 102 may include hardware and software components for establishing communications over a communication network 101. For example, the player system(s) 102 may be equipped with networking equipment and network software applications (for example, a web browser) that facilitates communications via one or more networks (for example, the Internet or an intranet). The player system(s) 102 may have varied local computing resources 104, such as central processing units and architectures, memory, mass storage, graphics processing units, communication network availability and bandwidth, and so forth. Further, the player system(s) 102 may include any type of computing system. For example, the player system(s) 102 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the player system(s) 102 may include one or more of the components or embodiments described below.

In some embodiments, the player system(s) 102 may include a webcam to record a video of the user, a camcorder, a camera, a camera on a mobile phone, and/or the like. The player system(s) 102 may include a microphone to record a voice of the user, a headset with an audio input, a webcam with an audio input, and/or the like. The player system(s) 102 can include a user screen capture module to record a stream of the user's screen during gameplay, record player input (such as on a mouse and/or keyboard), and/or the like.

1. Game Application

In some embodiments, the player system(s) 102 is capable of executing one or more game applications 108, which may be stored and/or executed locally and/or in a distributed environment. In a locally executed game application 108, generally, the game does not rely or utilize an external computing system (for example, the interactive computing system 130) to execute the game application 108. In some instances, a locally executable game can communicate with an external server to retrieve information associated with the game, such as game patches, game authentication, clouds saves, custom virtual character data, user account data, or other features. In distributed game applications, the player system(s) 102 may execute a portion of a game and the interactive computing system 130, or an application host system 132 may execute another portion of the game. For instance, the game may be a massively multiplayer online role-playing game (MMORPG) that includes a client portion executed by the player system(s) 102 and a server portion executed by one or more application host systems 132. The game application 108 may be any type of game, including multiplayer games (such as, for example, massively multiplayer online role-playing games (MMORPG), multiplayer first person shooters (FPS), mobile online battle arenas (MOBA), racings games, sports games, and other multiplayer games) and single player games (such as for example, role playing games (RPG), adventure games, puzzle games, and other single player games).

The player system(s) 102 can execute a game application 108 based on software code stored at least in part in the application data store 106. The game application 108 may also be referred to as a videogame, a game, game code, and/or a game program. A game application 108 should be understood to include software code that a player system(s) 102 can use to provide a game for a user to play. A game application 108 may comprise software code that informs a player system(s) 102 of processor instructions to execute, but may also include data used in the playing of the game, such as data relating to constants, images, and other data structures. In the illustrated embodiment, the game application 108 includes a game engine 110, game data 112, game state information 116, and a record and playback module 114. The record and playback module 114 can be used to implement various aspects of the gameplay playback system.

The game application 108 can be configured to display sponsorship content within rendered frames generated by a rendering engine of the game application 108. The sponsorship data may include instructions identifying portions of a game interface that should include the sponsorship content, such as, an image or advertisement, to either overlay or render with the gameplay frames. The instruction may also indicate what data the sponsor matching system 140 should obtain from the remote data store 123. In some embodiments, the image(s) associated with a sponsor can be stored and accessed from a data store 134. The game application may request sponsor content (for example, content can include images, animations, or videos) associated with one or more sponsors from the data store 134 for display during runtime of the game application. In some embodiments, the sponsorship matching service 140 can provide instructions to the game application to include specific customized interface or video elements during the display of the game application during a gameplay session.

a. Game Engine

The game engine 110 can be configured to execute aspects of the operation of the game application 108 within the player system(s) 102. Execution of aspects of gameplay within a game application can be based, at least in part, on the player input received, the game data 112, and game state information 116. The game engine 110 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 110 can receive the player inputs and determine in-game events, such as actions, jumps, runs, throws, attacks, and other events appropriate for the game application 108. During runtime operation, the game engine 110 can read in game data 112 and game state information 116 to determine the appropriate in-game events.

b. Game Data

The game data 112 can include game rules, prerecorded motion capture poses/paths, environmental settings, environmental objects, constraints, skeleton models, tutorial information, route information, and/or other game application information. At least a portion of the game data 112 can be stored in the application data store 106. In some embodiments, a portion of the game data 112 may be received and/or stored remotely, such as in a remote data store (not shown) associated with the interactive computing system 130. In such embodiments, game data may be received during runtime of the game application.

c. Game State Data

During runtime, the game application 108 can store game state information 116, which can include a game state, character states, environment states, scene object storage, route information and/or other information associated with a runtime state of the game application 108. For example, the game state information 116 can identify the state of the game application 108 at a specific point in time, such as a character position, character orientation, character action, game level attributes, and other information contributing to a state of the game application. The game state information can include dynamic state information that changes during a gameplay session, such as character movement positions, and static state information that is constant during a gameplay session. In some embodiments, at least a portion of the game state information can be updated on a periodic basis, such as multiple times per second. In some embodiments, the game state information can be updated on an event-based basis.

d. Record and Playback Module

In some embodiments, the record and playback module 114, in some implementations, can be configured to implement recording of gameplay videos with embedded state parameters by the game application 108. The record and playback module 114 can include an identification of a defined set of state parameters that are stored during recording of a gameplay video. The state parameters can be stored within the video file, in a separate file, or in a separate location such as a network-based data store. The defined set of state parameters can be a subset of the total state parameters used by the game application to define a game state within the game environment. In some embodiments, the defined set of state parameters can be a minimum number of state parameters required for creation of a gameplay state. In some embodiments, the recorded state parameters can be limited to state parameters that influence the actions of a player character within the game. In some embodiments, the one or more parameters may be preselected by the game distributor, the user, or others.

As used herein, the term "player character" refers to a virtual entity that is controlled by a user. The player character can refer to any entity controlled by a user, including, but not limited to, a person, a vehicle, a group of people, a team, an object or any other entity.

In some embodiments, the defined parameters include state parameters that are used to generate a game state within the game application. Some examples of state parameters include positional parameters (such as, for example, momentum, character position, proximity to other characters, and the like), game environment parameters (such as, for example, the state of components within the game environment, game level, camera position, position of items, and the like), player character parameters (such as, for example, player items, player character level, player character attributes and skills, and the like), non-player character parameters (such as, for example, non-player character position, proximity to the player, activity within the game state), and other types of state parameters for generating a game state.

The parameters can be selected and defined according to the specific game application. Each game application can have different parameters that are recorded and used for generation of a game state. At a defined time interval, the values associated with each defined state parameter are recorded. In some embodiments, the record and playback module 114 dynamically selects state parameters based on the state of the game at the time of recording. For example, the number of defined state parameters can vary dependent upon the state of the game. In some embodiments, the defined set of state parameters are the same regardless of the current state of the game. In some embodiments, all of the state parameters are stored at each time interval.

In some embodiments, the record and playback module 114 can determine the frequency at which the state parameters are recorded. In some embodiments, the frequency can be determined by a developer, a user, or others. The defined time interval between recording events can be periodic. For example, the defined set of state parameters can be recorded every second, every two seconds, every 500 milliseconds, or any other defined time period. Each recorded dataset of state parameters can be independent of the other recorded datasets, such that the dataset does not rely on a previous dataset recreate a game state. In some embodiments, the system can utilize multiple datasets to recreate a game state.

The record and playback module 114, in some implementations, can be configured to recreate a game state based on the state parameters stored within a gameplay video. The record and playback module 114 can create the game state based, in part, on the stored values associated with the defined set of state parameters and using additional information associated with the game application 108. The additional information can be used to fill in the information that is not stored in the gameplay video. Using information that is not specific to the saved game state can result in variations in certain aspects of the game state. For example, the fans in a stadium, the weather, the colors, or other elements of the game state may differ from the original state. Advantageously, in some embodiments, the defined state parameters can be configured to store only the information that is necessary to create a game state that affects gameplay characteristics for the user. In some embodiments, the playback module can synchronize video, audio, and other data associated with a gameplay vide. For example, the video, audio, and game state data can be stored in different locations such as separate data stores, and a reference identifier associated with the gameplay video can be used to access the associated gameplay video data, such as video, audio, game state data, and so forth.

2. Application Data Store

In some embodiments, the player system(s) 102 can include an application data store 106. The application data store 106 can be configured to store data associated with one or more game applications, local account data associated with an account maintained for the user by the interactive computing system 130 and/or other game-related or account-related data. In some embodiments, data store 106 can store player data associated with a player playing one or more games on a player system 102 associated with the player. Player data 1002 is described in more detail above with respect to the interactive computing system 130 (for example, player data 148).

C. Sponsor System(s)

In some embodiments, the sponsor system(s) 122 can be controlled by a sponsor. The sponsor system(s) 122 may include hardware and software components for establishing communications over a communication network 101. For example, the sponsor system(s) 122 may be equipped with networking equipment and network software applications (for example, a web browser) that facilitates communications via one or more networks (for example, the Internet or an intranet). The sponsor system(s) 122 may have varied local computing resources such as central processing units and architectures, memory, mass storage, graphics processing units, communication network availability and bandwidth, and so forth. Further, the sponsor system(s) 122 may include any type of computing system. For example, the sponsor system(s) 122 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the sponsor system(s) 122 may include one or more of the components or embodiments described below.

D. Video Streaming Service

The video streaming service 118 can stream content from users that broadcast content. The broadcast content can be provided by a broadcast computing system or by the player system 102. The broadcast computing system can be associated with a user that has a user account on the video streaming service 118. The broadcasting user can provide broadcasts associated with video game applications 108, where the broadcast includes a live stream of the user playing a game application 108 in real time. For example, the broadcasts may include playthroughs of video games, broadcasts of e-sports competitions, creative content, and other types of content. Such video can include the sponsorship data as described herein.

The video streaming service 118 can provide viewing users, also referred to as viewers, with various options for viewing content. Content from the video streaming service may be viewed live or on-demand. The content may be viewed in various levels of quality (such as for example, high definition or standard definition). A viewing user interfacing with the video streaming service 118 using a viewer computing system 124 may have access to a search function for accessing various types of streaming video content. For example, the user may be able to search for content by game title, featured games, by event, by broadcaster, by popularity, video game system, favorite channels, or other topics. The video streaming service may provide chat functionality that provides users with an interface to communicate with the broadcaster and other viewers. Chat functionality may include audio and text-based chat systems. In some embodiments, a stream may include an announcer that is different than the broadcaster providing audio commentary on gameplay of a game application 108. The steaming video service 118 may also provide streaming capability for multiple streams of content integrated into a single viewable stream by the viewer. For example, a streaming channel may include a stream of the game application 108 (including audio and video data from the gameplay of the game application 108), also referred to as a gameplay stream, and a stream of the broadcaster (including audio and/or video data of the broadcaster), also referred to as a broadcaster stream.

1. Game Application Interface Module

The game application interface module 120 can be configured to interface with a game application located on a player system 102 or a broadcast computing system, in order to stream content directly to the video streaming service 118. For example, the game application interface module 120 can be configured to interface with game consoles (such as, for example Xbox® consoles), game hosting software applications (such as, for example, Electronic Art's Origin software), specific game applications, video card software applications, and other systems that provide can broadcast a gameplay stream to the video streaming service 118. In some embodiments, the gameplay stream may include gameplay data, such as, gameplay state information, associated with the live gameplay session of the game application 108. The game application interface module 120 may communicate with the interactive computing system 130. In some embodiments, the game application interface module may have a plugin type module configured to communicate gameplay information associated with the gameplay stream to the interactive computing system 130. For example, the video streaming service 118 may provide the game application streaming service 138 with gameplay information used to provide a viewer, such as a viewer computing system 124, with access to a streamed game application 108.

E. Viewer Computing System

The computing environment 100 illustrates embodiments of a viewer computing system 124. The viewer computing system 124 includes computing resources 104, such as hardware and software resources, networking equipment, and one or more application data stores 106. The viewer computing system 124 may include a browser application 126 for navigating a network (such as the Internet) and interfacing with the video streaming service 118 and/or the interactive computing system 130. The viewer computing system 124 can include software and/or hardware configured to execute a game application 108, such as described with respect to player system 102. The viewer computing system 124 may include a game application streaming client 128. The viewer computing system 124 may include any type of computing system, such as, a game console, a handheld gaming console, mobile computing device, a laptop or desktop computer, and the like.

1. Game Application Streaming Client

The interactive game application client can be configured to communicate with the game application streaming service 138 in order to stream one or more game applications 108, whereby the game application 108 is executed using the computing resources of the game application streaming service 138. The game application streaming client 128 can be configured to communicate with the game application streaming service 138 in order to output the execution of the game application on the viewer computing system 124. The viewer system 124 can provide an interface for input provided by the user to be communicated to the game streaming service to control operation of a streaming game 108 as if were being executed locally on the viewer computing system 124. The game application streaming client 128 can provide an interface to a user to select game application(s) 108 that are available through the game streaming service.

Virtual Environment

A virtual environment may comprise a simulated space (e.g., a physical space) instanced on a server that is accessible by a client (e.g., player system 102) located remotely from the server, to format a view of the virtual environment for display to a user of the player system 102. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

Data Flow Between System Components of Sponsorship System

Figure 2:
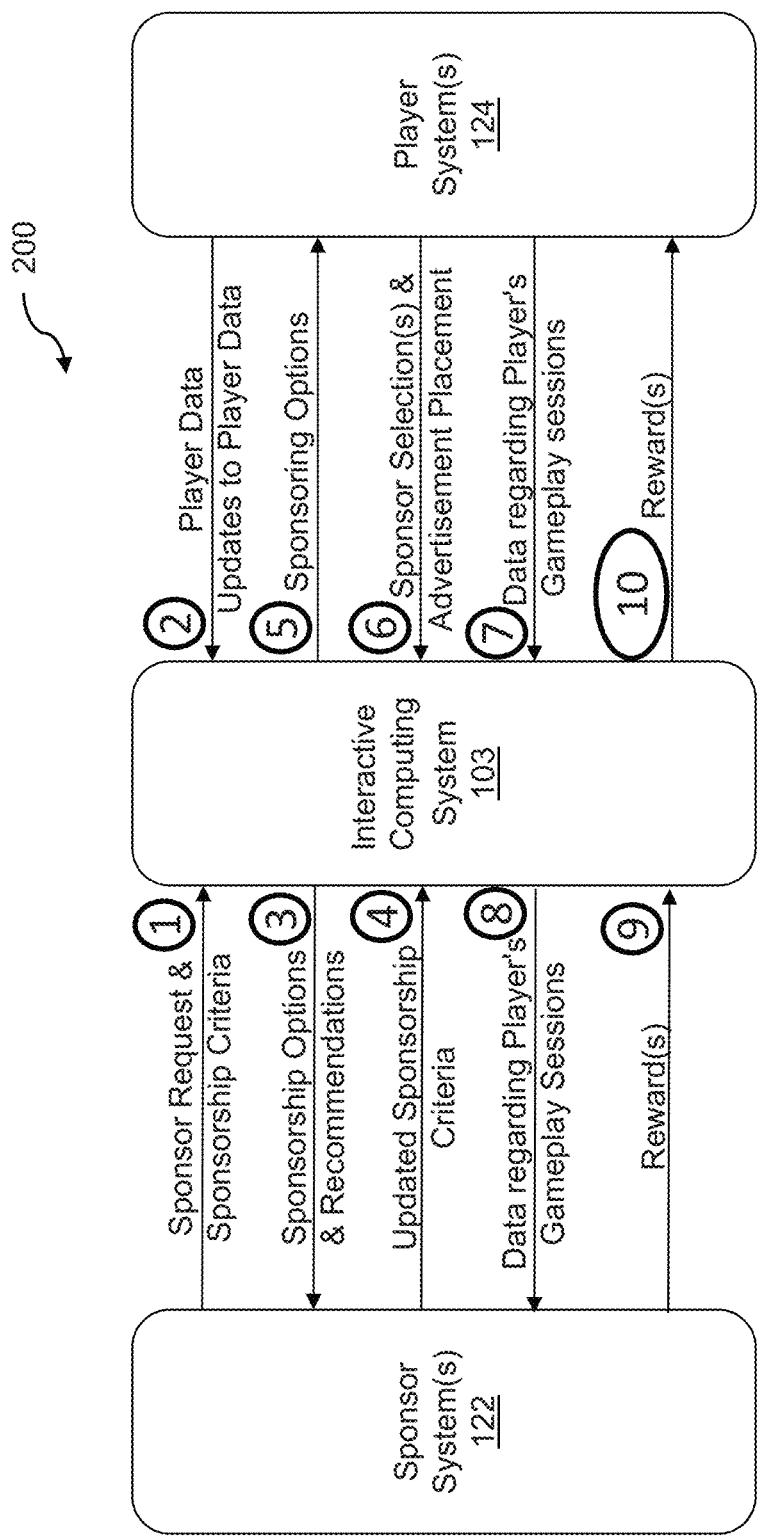
FIG. 2 illustrates of an embodiment of a block diagram of interactions between various systems from FIG. 1 implementing an automated sponsorship system.

FIG. 2 illustrates an embodiment 200 of a block diagram of interactions between the sponsor matching system 140, the sponsor system 122, and the player system 102. The sponsor matching system 140, is in communication with one or more sponsor system(s) 122 and one or more player system(s) 102 and is also configured so that data can be transferred between all systems. The description generally refers to actions being performed by the player and/or the sponsor. It is to be understood that such actions are being performed by a player system or a sponsor system on behalf of their respective users.

At (1), a sponsor system 122 can send a request to an interactive computing system 130 identifying a set of sponsorship criteria for potential sponsorship of one or more players. The sponsorship criteria define the types and characteristics of the players that a sponsor would be interested in sponsoring. The sponsorship criteria may include specific metrics or thresholds, such an identification of games or types of games that are played, a player ranking, average playtime, social media/game streaming statistics (e.g., number of followers, average viewers, and the like), and/or other explicitly designated criteria. The sponsorship criteria may include a selection of sponsorship options that are generated by the sponsor matching system 140. The sponsor matching system 140 may provide categories that define general characteristics of players that can be selected by the sponsor. For example, categories may include rising stars, charismatic, influencer, competitive, enjoyable to watch, funny, product pusher, or other groupings that do not have metrics that readily define a player grouping. The sponsor may be able to choose one or more of the categories.

In some embodiments, the request can include sponsor content (for example, content may include animations, video, images, and/or other audio/visual content) that the is for use by a sponsored player. In some embodiments, a player may have a plurality of sponsors and sponsor content associated with each sponsor may be selected for display by a player. The sponsorship criteria can include rules that define usage restrictions on how the sponsor content may be displayed and/or used by the player. For example, a sponsor may require particular sponsors or possibly that no other sponsors, are displayed at the same time as a selected sponsor.

At (2), the computing system can receive or monitor player data associated with a plurality of players playing one or more games, player preferences for potential sponsors or sponsorships, and store the data and analytics associated with such data in a data store. In some embodiments, updates to the player data (for example, gameplay data after a player plays more of a game, or updates to player preferences, or new components for the player system were installed) can also be monitored or received by the interactive computing system 130. For example, player data can include gameplay data associated with each player or player account, player account information, player system 102 specification information, or the like.

Player preferences can include advertising preferences of a player associated with a particular player system 102. For example, a player may configure rules identifying types of sponsors the player would prefer or require to be matched with. The player may define types of acceptable sponsors. For example, a player may create a blacklist (or a whitelist) designating the unacceptable or acceptable sponsors by name or type that the player is willing to accept as a sponsor. The player data is described in more detail herein and in reference to FIG. 1, for example.

At (3), the sponsor matching system 140 can identify players based on the sponsorship criteria and/or or player data. The sponsor matching system 140 can transmit matching data identifying the identified players to the sponsor system 122 as sponsorship options and recommendations. The sponsor matching system 140 can continue to identify players based on updated player data, updated sponsorship criteria, and/or updated matching models.

At (4), optionally, a sponsor may update their sponsorship criteria. For example, if a sponsor does not like the sponsorship options and recommendations provided by the sponsor matching system 140. A sponsor may choose to adjust or update the sponsorship criteria based on various factors (for example, success of a particular advertising image, success of advertising with a particular player or set of players, shifting interest of the sponsor, or any other reason that may affect the advertisement interested or business interests of a sponsor).

At (5), the sponsors can select one or more players to sponsor and transmit the selection to sponsor matching system 140. In some embodiments, the sponsoring options received by a player can be pre-filtered (e.g., prior to the identification of the players for the sponsor and/or prior to sending the sponsorship to the player) based on any preconfigured player data (for example, player preferences indicating the type of sponsors the player is willing to accept, or the advertisement placement locations the player is willing to place sponsorships, etc.).

At (6), the player system 102 can receive from a player a selection of one or more sponsor and one or more advertisement placement locations from the available sponsorship options. The selected sponsorship options can be displayed within the game application during runtime of a video game session. For example, the selected advertisements may appear as an overlay on one or more virtual avatars associated with the player or as an overly within the user interface of the game application in the designated locations. For example, a player can be presented, via a player system 102, with a list of 5 potential sponsors and associated advertisement images or content (for example, content can include animations or video as well as images). The player can indicate that it selects sponsors 2 and 4, of the list of 5 potential sponsors. The player can also indicate the location of where the player wants the advertisement content for sponsors 2 and 4 to be placed in designated locations on the user interface within the game application.

At (7), the player system(s) 102 can also transmit player data associated with gameplay sessions of a player. The player data may include analytics that can be tracked from the player system 102, or from the interactive computing system 130. Analytics can measure in-game telemetry data, social media data, and/or other data associated with a player's gameplay session. In-game telemetry data may include data gathered by the game application during a gameplay session such as, length of play session, the amount of time an advertisement was displayed during a gameplay session, what advertisement was placed achievements earned by the player, the location of the advertisement placement, and/or other types of telemetric data recorded during a gameplay session. Social media data may include data associated with social media sites and applications (such as, Twitch, YouTube, Twitter, Facebook, and the like) that are associated with a gameplay session, such as how many viewers watched the player's game stream, the number of comments generated, the number of stream subscribers, number of views of a prerecorded video (e.g., a YouTube video), number shares, number of likes, and/or other social metrics associated with the gameplay session.

At (8), the data from (7) can be transmitted to or accessed by the sponsor system(s) 122. The data can be used to influence the sponsorship criteria and how it should or should not be updated by a sponsor (for example, in step (4)). In some embodiments, automatic algorithms can adjust the sponsorship criteria automatically (for example, if a setting is turned on by the sponsor) with the user of machine learning or AI as discussed herein. For example, machine learning can be used to predict when a player is playing less or disqualifies from the sponsorship criteria. As soon as a certain threshold is no longer satisfied by a player, then an automatic action can be taken to remove the sponsorship advertisement or change the advertisement (for example, by replacing one image with another image provided for by the sponsor).

At (9), the sponsor can provide reward criteria that defines how a sponsored player receives rewards. The reward criteria can include instructions on how to distribute rewards to particular players. Rewards can be distributed based on various metrics such as number of viewers, time playing the game, clicks on the advertisement (for example, in some embodiments, a viewer can select a location on a streamed video of a player gameplay that corresponds with the location of the advertisement associated with a sponsor to navigate to a website associate with the sponsor). In some embodiments, the sponsor matching system 140 can be used as the intermediary to transfer the compensation and/or stream or video of the player's gameplay. In some embodiments, the player can earn virtual currency by fulfilling the reward criteria. The virtual currency may be specific to the sponsor (for example, the virtual currency could be redeemed for the sponsors merchandise), may be virtual currency used within the game applications that the player is playing, or another type of virtual currency.

At (10), rewards can be distributed to the player by the interactive computing system 130 based on fulfillment of the reward criteria provided by the sponsor system 122.

Although an order is depicted in FIG. 2, it should be appreciated that data can flow back and forth between the various systems and in any order, and the various operations 2 can be performed in a different order than described herein. Some steps may be omitted or combined. For example, the reward criteria provided by the sponsor may be included with the sponsorship criteria. As another example, after receiving the sponsorship criteria, the sponsor matching system 140 may automatically identify players and provide sponsorships to the identified players without requesting additional approval from the sponsor.

Flowcharts

Figure 3:
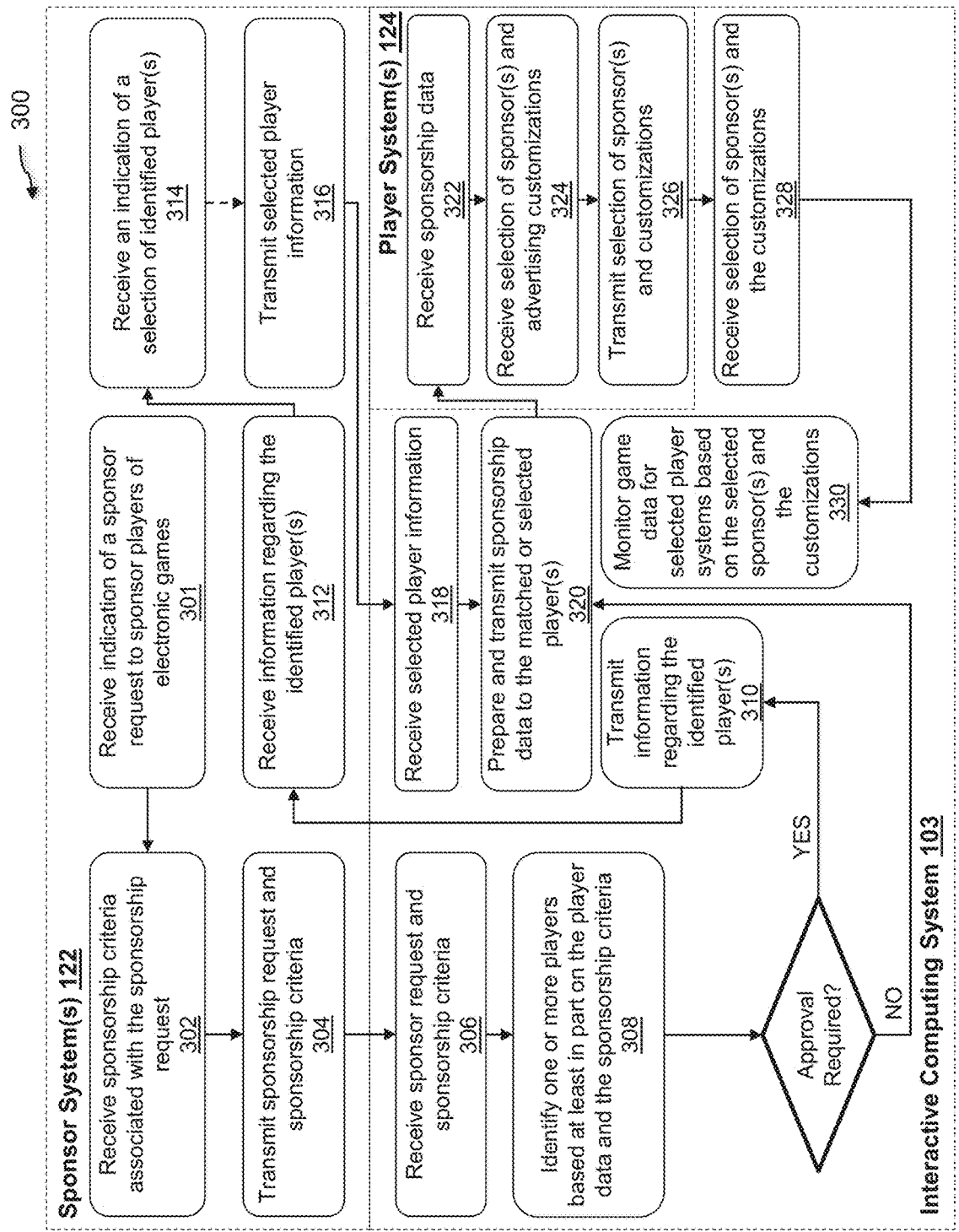
FIG. 3 shows an embodiment of a flow diagram of a method for matching a selected player to sponsors and generating game data based on selections indicated by sponsor systems and player systems, according to one embodiment.
Figure 4:
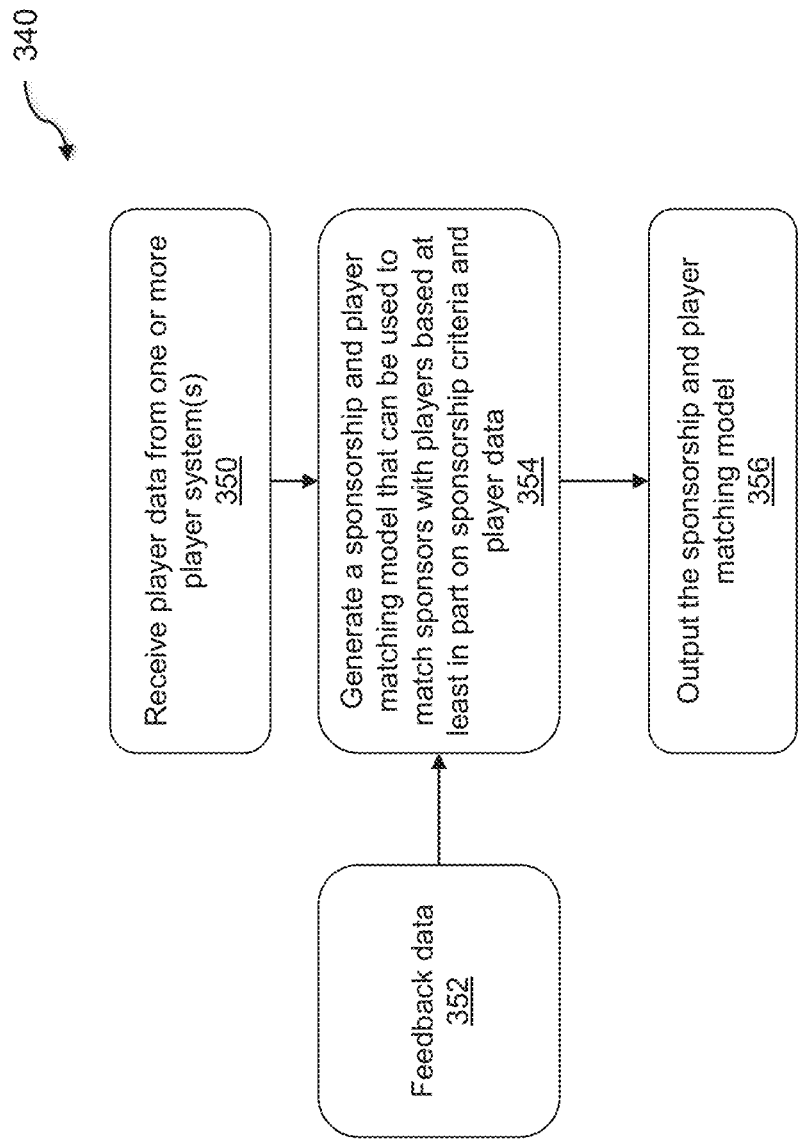
FIG. 4 shows an embodiment of a flow diagram of a method for generating and updating a player matching model.
Figure 5:
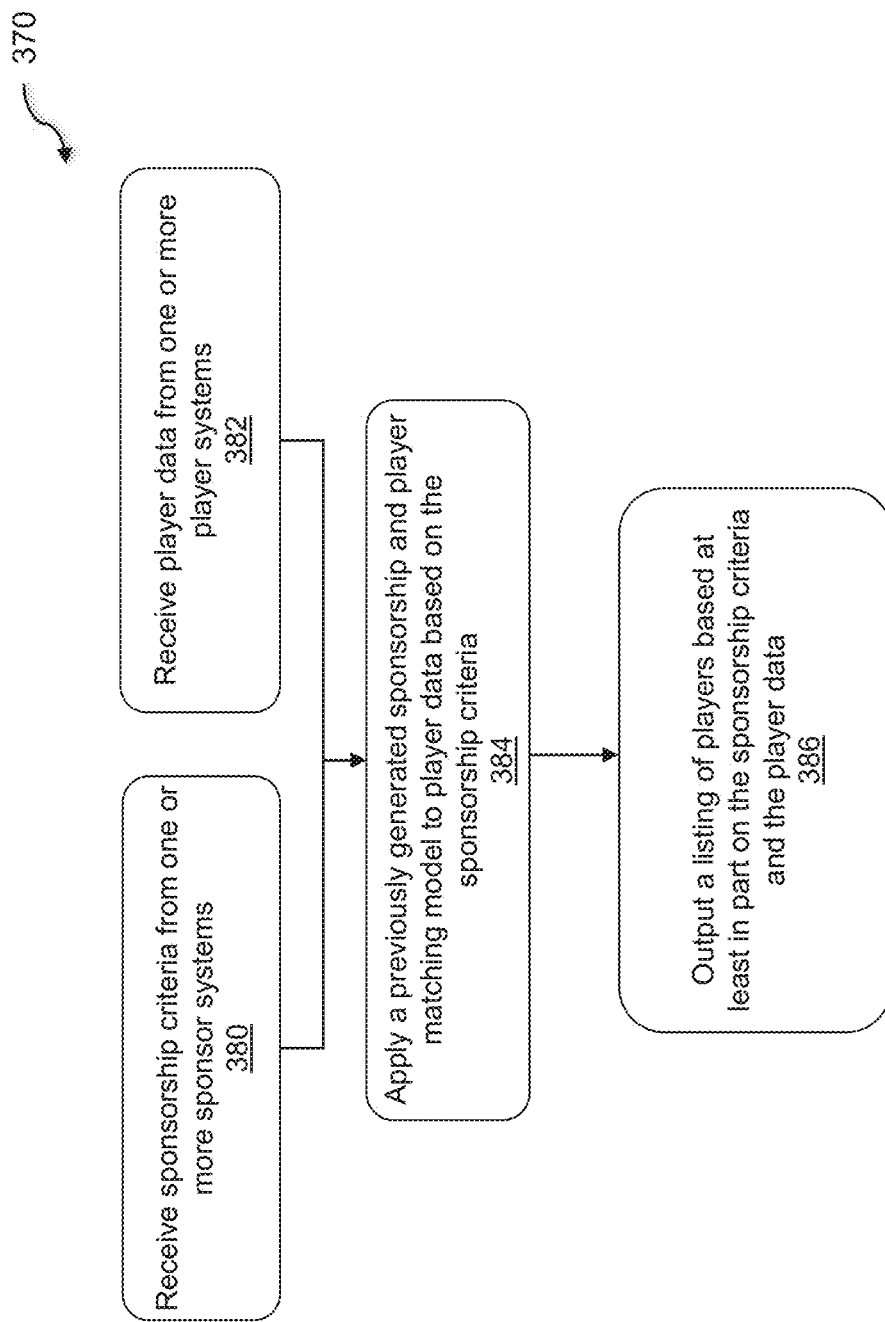
FIG. 5 shows an embodiment of a flow diagram of a method for applying a previously generated sponsorship and player matching model, according to one embodiment.

FIGS. 3-5 show flow diagrams of methods for matching a selected player to sponsors, generating game data based on selections indicated by sponsor systems and player systems, and generating, updating, and applying a sponsorship and player matching model, according to some embodiments. Although any number of systems, in whole or in part, can implement the methods and processes described, to simplify discussion, the methods and processes will be described with respect to particular systems. Further, although embodiments of the methods and processes may be performed with respect to variations of systems comprising various components, to simplify discussion, the methods and processes will be described with respect to the sponsorship matching system 140.

Process for Generating a Player Matching Model

FIG. 3 shows a flow diagram of a method 300 for matching a selected player to sponsors and generating game data based on selections indicated by sponsor systems and player systems, according to one embodiment. As discussed above, the interactive computing system 130, player system(s) 102, and sponsor system(s) 122 can be the same systems described above with respect to FIGS. 1 and 2, or different systems. In some embodiments, the sponsor matching system 140 can comprise multiple systems connected via a local area network or via the internet. Also, in some embodiments the interactive computing system 130, or portions thereof, can be located on the sponsor system(s) 122 and/or player system(s) 102.

In block 301, one or more sponsor system(s) 122 can receive an indication of a sponsorship request to sponsor one or more players of one or more electronic games. The electronic games can comprise online games, multiplayer games, single player games, or any other type of game playable on a console (for example, PlayStation, Xbox, or Nintendo consoles) or a personal computer (PC).

In block 302, the sponsor system(s) 122 can receive user inputs identifying sponsorship criteria for a sponsorship request. The sponsorship criteria may include specific metrics or thresholds identified by the sponsor and/or a selection of sponsorship options that are generated by the sponsor matching system 140. The sponsorship request can comprise an indication that a sponsor desires to sponsor one or more players based on the sponsorship criteria.

In block 304, the sponsor system(s) 122 transmits the sponsorship request and sponsorship criteria to an interactive computing system 130. In block 306, the interactive computing system 130 receives the sponsorship request and the sponsorship criteria.

In block 308, the interactive computing system 130 identifies one or more players based at least in part on the player data and the sponsorship criteria. The matching engine 146 can identify players using defined algorithms and/or machine learning models based on player data and the sponsorship criteria as inputs. The sponsorship criteria may be used to pre-filter the players that can be identified, for example, the players may be limited to the top 1% of players, or the player can have an average number of viewers greater than a certain threshold, or other criteria. It should be appreciated that to increase the effectiveness of a match, it is desirable in some instances to match players to sponsors based on criteria submitted by both parties (for example, player preferences and sponsorship criteria). However, in some embodiments, recommendations based on predictive matching using machine learning models, may be presented to the sponsors. Such predicted matching can be based on criteria that was not explicitly provided by a sponsor or player, and, in some cases, may even contradict some criteria provided by sponsor(s) and/or player(s).

In some embodiments, a player system(s) 102 can receive or collect player data and player preferences for a plurality of players. Player data can include gameplay data associated with each player or player account, player account information, player system 102 technical specification information, or the like. Player preferences can comprise preprogrammed or default preferences for each player of the plurality of players. Such preferences can include what sponsors or types of sponsors the player prefers or requires, or what advertisement placement locations are available to sponsors and/or the placement locations that are not available to sponsors. The player system(s) 102 can transmit the player data and player preferences for a plurality of players to an interactive computing system 130, and the interactive computing system 130 can receive the player data and player preferences.

Next, the interactive computing system 130 determines whether approval is required for the match. In some embodiments, for the same interactive computing system 130, certain matches may trigger an approval requirement and other matches may not trigger an approval requirement. In some embodiments, some sponsors may require all matches to be approved, some sponsors may require only certain types of matches to be approved, and some sponsors may require not matches to be approved and to automatically transmit sponsorship data to matched or selected players.

If approval is not required, then proceed to block 320 described below.

If approval is required, then in block 310, the interactive computing system 130 transmits the at least one player to the sponsor system(s) 122. In block 312, the sponsor system(s) 122 receives the at least one player from the interactive computing system 130. It should be appreciated, that in some embodiments, the at least one player includes only players that meet the player preferences for each player listed as well as the sponsorship criteria.

In block 314, the sponsor system(s) 122 receives a selection of one or more identified players. The sponsor may select any number of players. In block 316, the sponsor system(s) 122 transmits the selected player information to the interactive computing system 130. In block 318, the interactive computing system 130 receives the selected player information from the sponsor system(s) 122.

Once selected player information is received by the interactive computing system 130 from the sponsor system(s) 122, or if approval of a match is not required, then in block 320, the interactive computing system 130 processes the selected player information to generate sponsorship data. Sponsorship data can be generated, for example, to include information that indicates the sponsors selected a particular player, the advertisement placement locations required by each sponsor, and/or the value associated with each advertisement placement location for each sponsor. In some embodiments, the sponsorship data is filtered to remove any sponsors and/or advertisement placement locations that do not meet a particular selected user's player preferences. In some embodiments, sponsorship data can include sponsors and/or advertisement placement locations that conflict with a particular selected user's player preferences. In such a case, for example, machine learning algorithms can be used to predict which sponsors and/or advertisement placement locations a particular selected player may choose. For example, if a particular advertisement location is marked as "not desired" or set to be filtered out by a player via the player's player preferences and the particular advertisement placement location provides a substantial compensation value to the player, the interactive computing system 130 may include the particular advertisement placement location in the sponsorship data transmitted to the player system(s) 102 in block 320.

In block 322, the player system(s) 102 receives the sponsorship data from the interactive computing system 130. In block 324, the player system(s) 102 receives a selection of one or more sponsors and advertising customizations, where the selection and advertising customizations is indicative of one or more sponsors and advertisement placement location an associated player to the player system(s) 102 desires to place advertisements.

In block 326, the player system(s) 102 transmits the selection of one or more sponsors and the advertising customizations to the interactive computing system 130. In block 328, the interactive computing system 130 receives the selection of one or more sponsors and the advertising customizations from the player system(s) 102.

In block 330, the interactive computing system 130 can monitor game data for each of the selected player system(s) 102 based on the selection of one or more sponsors and the advertising customizations. In some embodiments, game data can be provided by the player system 102 to verify usage of the sponsorship/advertising content by the player during gameplay sessions. For example, the sponsorship monitoring service can track game data and social media data associated with the player in order to determine reward metrics and progress for the player. For example, the sponsorship monitoring service can track gameplay data (e.g., to determine how often the sponsor's content is displayed during a gameplay session), and social media data (e.g., to determine how many viewers watched the gameplay stream). In another example, the sponsorship monitoring service can determine how many times an embedded advertisement (such as a short advertising video) ran during a gameplay session.

Process for Generating a Player Matching Model

FIG. 4 shows a flow diagram of a method 340 for generating and updating a player matching model, according to one embodiment. In block 350, a system, (for example, an interactive computing system 130 or sponsor matching system 140) can receive player data from one or more player systems 124.

In block 352, feedback data can be transmitted to, retrieved or access by, the system. In some embodiments, the feedback data can include adjustments and weightings to the player data. The feedback data can be provided automatically through the use and implementation of a machine learning algorithm, or manually from an administrator of the system, for example.

In block 354, the system generates a sponsorship and player matching model that can be used to match sponsors with players based at least in part on sponsorship criteria and player data. The sponsorship and player matching model can be created based on AI or a machine learning algorithm. In some embodiments, and because player data is received whenever a player is playing a game, it can be desirable to update the sponsorship and player matching model frequently (for example, every second, every minute, every hour, every day, for example). Through the use of AI and/or a machine learning algorithm, the sponsorship and player matching model can be updated as frequently as desired.

In block 356, the sponsorship and player matching model is output from the system. In some embodiments, the sponsorship and player matching model can be output to an interactive computing system 130, or another device or system to apply the model.

As described above with respect to the machine learning component 118 of FIG. 1, for example, a number of different types of algorithms may be used. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component 118. For example, the models can be regenerated on a periodic basis as new player information is available to help keep the predictions in the model more accurate as the player information evolves over time.

Process for Selecting Players Based on Sponsorship Criteria

FIG. 5 shows a flow diagram of a method 370 for applying a previously generated sponsorship and player matching model, according to one embodiment.

In block 380, a system (a sponsor matching system 140, for example) receives sponsorship criteria from one or more sponsorship systems (sponsor system(s) 122, for example). In block 382, the system received updated player data from one or more player systems (player system(s) 102, for example).

In block 384, the system applies a previously generated sponsorship and player matching model to the updated player data based on the received sponsorship criteria. In some embodiments, the previously generated sponsorship and player matching model can be received from the method 340 of FIG. 4.

In block 386, the system can output a selection of players based at least in part on the sponsorship criteria and the updated player data. In some embodiments, the matching engine can output a selection of players comprising a recommended selection of players based at least in part on the sponsorship criteria and the updated player data. The recommended players may require secondary approval by the sponsor.

Example User Interface of Player System

Figure 6:
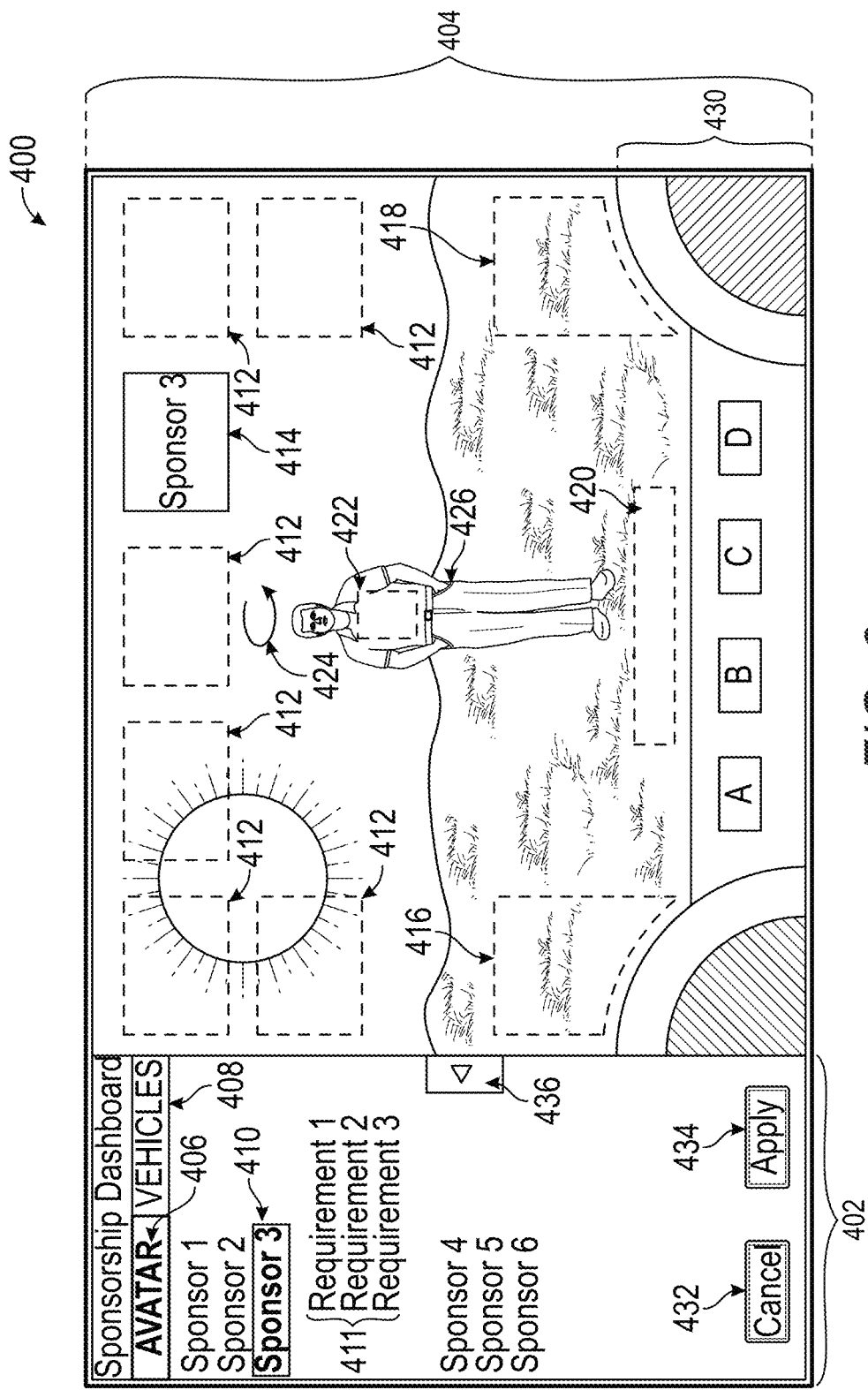
FIG. 6 shows an embodiment of an example interface for a player device to select a sponsor.
Figure 7:
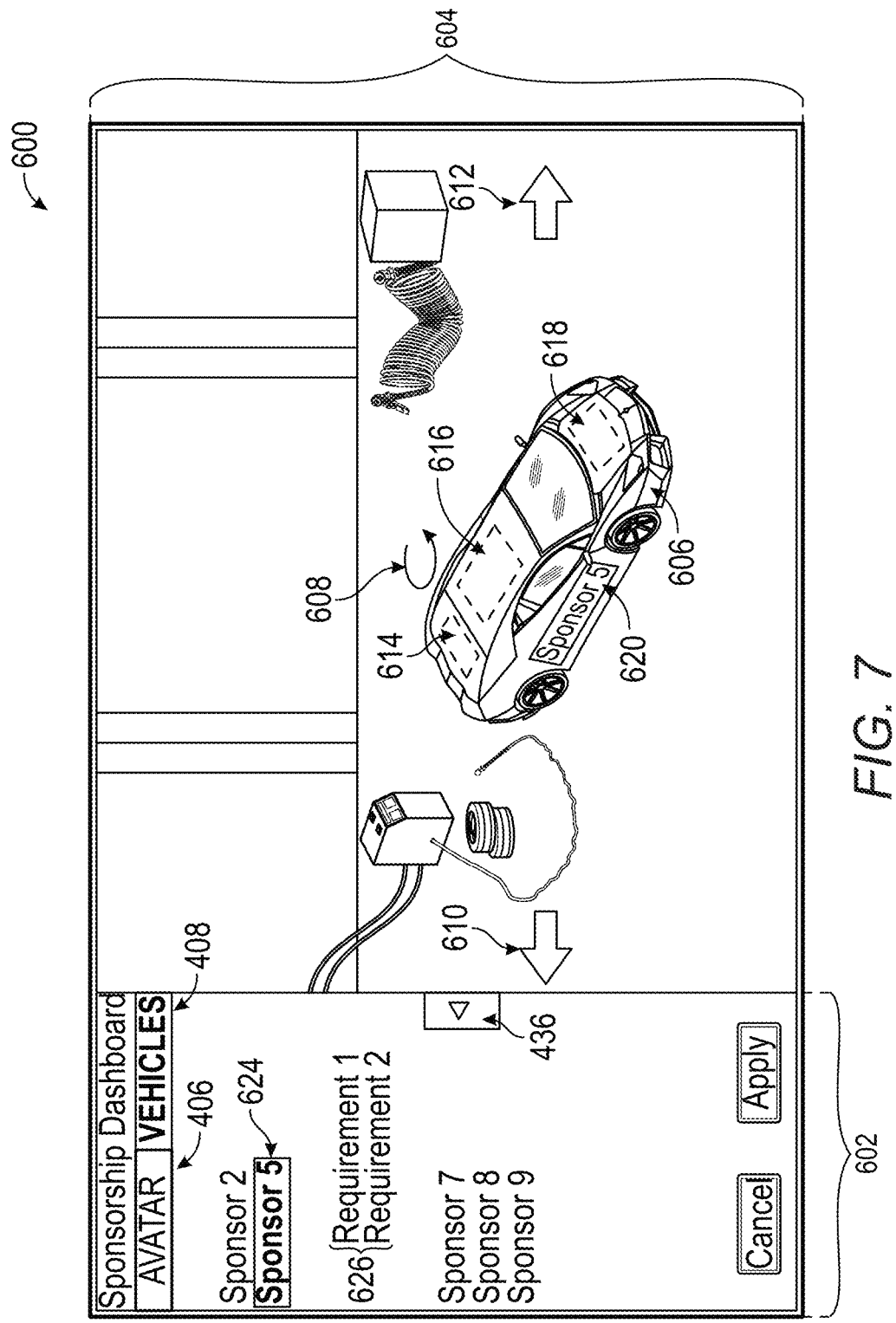
FIG. 7 shows an embodiment of an example interface for a player device to select a sponsor, according to one embodiment.
Figure 8:
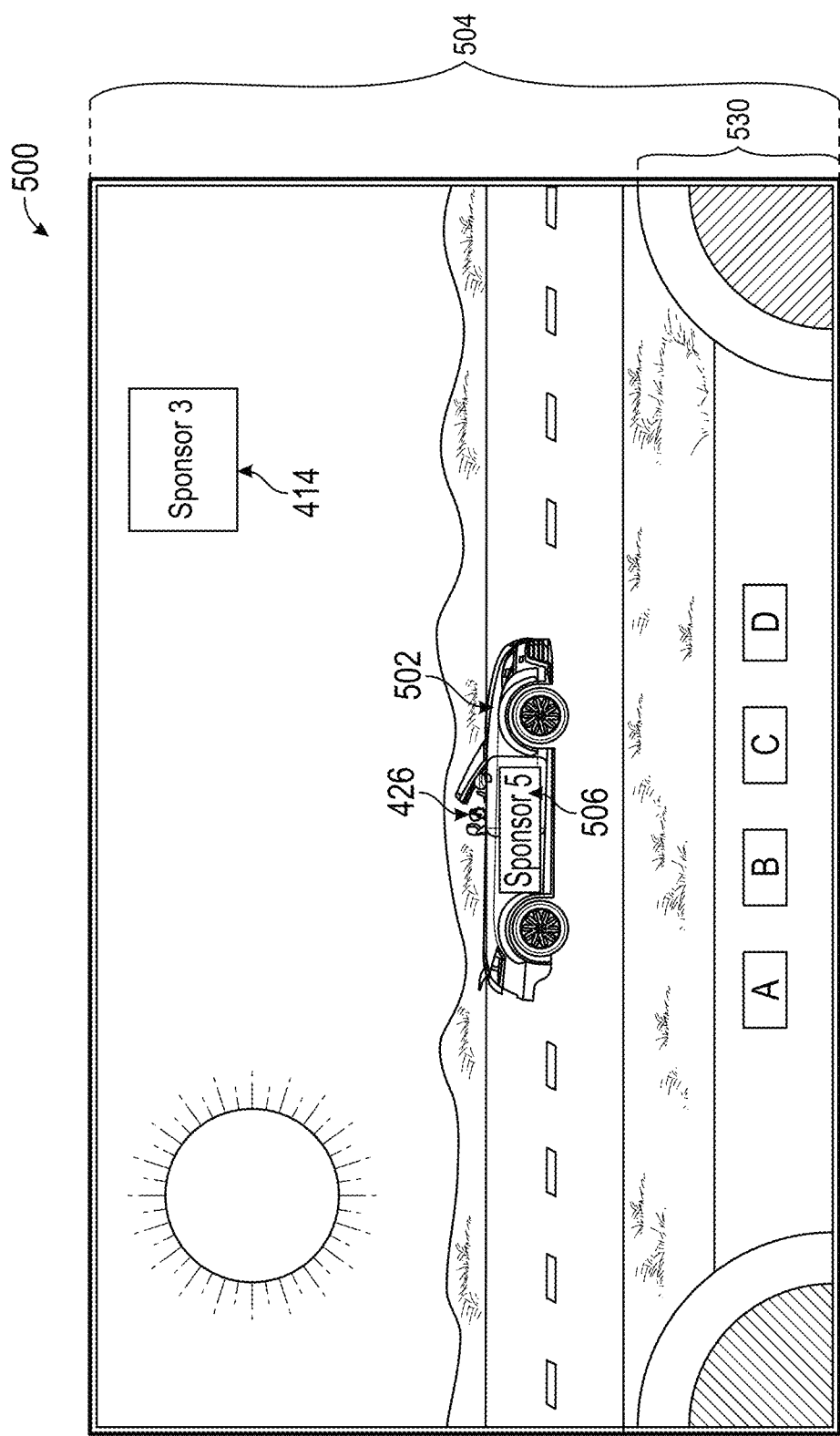
FIG. 8 shows an embodiment of an example interface during gameplay for a player device rendering a game after sponsors have been selected.

FIGS. 6-8 show example interfaces for a player device to select a sponsor and for rendering a game after sponsors have been selected, according to one embodiment. Specifically, FIGS. 6-7 show example interfaces for a player device to select a sponsor, and FIG. 8 shows example interface during gameplay for a player device. Although any number of interfaces can be implemented or used, in whole or in part, to simplify discussion, the interface generation and interaction methods and processes will be described with respect to particular systems. Further, although embodiments may be performed with respect to variations of systems comprising various components, to simplify discussion, the methods and processes will be described with respect to a sponsorship matching system 140, a player system 102, and a sponsor system 122.

Interface for Player Selection of Sponsor Advertisements

FIG. 6 shows an example interface 400 for a player device to select a sponsor, according to one embodiment. The interface 400 displays a sponsorship dashboard 402 and an example gameplay interface 404, where the example gameplay interface 404 includes user interface elements of how the interface will look during gameplay. For example, a toolbar 430 is shown comprising graphics and buttons "A," "B," "C," and "D" that would appear during gameplay. It should be noted that although toolbar 430 is depicted in this example, each game would have its own toolbar that may be customized by a player. Such toolbar with or without customization (for instance, the default toolbar) can be displayed to simulate the gameplay environment.

The sponsorship dashboard 402 includes two tabs, an avatar tab 406 and a vehicles tab 408. In FIG. 6, the avatar tab 406 is selected. FIG. 7, discussed below, depicts the interface associated with a selection of the vehicles tab 408. On the avatar tab 406, there is a list of sponsors shown. For example, "Sponsor 1," "Sponsor 2," etc. are listed. "Sponsor 3" 410 is shown as being selected. Upon selection, a list of requirements 411 (for example, "Requirement 1," "Requirement 2," and "Requirement 3") is shown under sponsor 3 410. The list of requirements 411 can show the one or more requirements, or sponsorship criteria, associated with the sponsor (for example, sponsor 3 410). Some of the sponsorship criteria may be met and, in some embodiments, those criteria can be indicated as being met by the player accessing this interface.

Upon selection of a sponsor (for example, sponsor 3 410), the example gameplay interface 404 can be updated to show all advertisement placement locations (for example, 412, 414, 418, 420, and 422) available based on the sponsorship settings, any player preferences, and/or any game administrator. A player can then select an advertisement placement location 414 where the player desires to place the sponsor 3 410 advertisement. The example gameplay interface 404 can then be updated to display the image or content associated with the sponsor 3 410 advertisement as a preview of how the interface will appear during gameplay. The example gameplay interface 404 also includes an avatar 426 that can match any customizations provided by the player. The avatar 426 can be spun around (for example, by selecting the avatar 426 with a mouse or finger, if on a touchscreen device, and/or by interacting with the circular arrow 424). The avatar 426 includes an advertisement placement location 422 on the front of the avatar 426 that can be selected to place an advertisement associated with sponsor 3. The avatar 426 can also include an advertisement placement location on the back of the avatar 426 (for example, if the avatar 426 were wearing a jersey for a sports game) and allowing the avatar 426 to spin the player view both sides of the avatar 426.

In some embodiments, the advertisements associated with the sponsors can vary based on the advertisement placement location selected. For example, a player can select sponsor 3 410 from the sponsorship dashboard, then the player can select advertisement placement location 414 to view one advertisement image, and advertisement placement location 422 to view a different advertisement image. Having multiple types of images can be desirable in some embodiments so that advertisement placement locations with more or less screen space can optimize the type of advertisement displayed. Additionally, in some embodiments, a player, a sponsor, or an administrator of the sponsor matching system can permit or forbid certain advertisements from appearing in certain advertisement placement locations as well. For example, advertisement placement locations available or advertisements available for particular advertisement placement locations can be programmed as to not interfere with gameplay.

A player can select minimize button 436 to hide the sponsorship dashboard 402 and view the example gameplay interface 404 in full screen. Also, in some embodiments, upon selection of the minimize button 436, the example gameplay interface 404 can hide all advertisement placement locations that have not been selected (for example, 412, 418, 422, and 426).

Once a sponsor and advertisement placement location are selected (for example, sponsor 3 410 and the advertisement placement location that is at the top of the example gameplay interface 404 and second from the right), a player can either selected cancel 432 or apply 434 to either revert to the prior settings or apply the changes, respectively.

Interface for Player Selection of Sponsor Advertisements on Vehicles

FIG. 7 shows an example interface 600 for a player device to select a sponsor, according to one embodiment. The interface 600 comprises a sponsorship dashboard 602 and a car customization screen 604. When the vehicles tab 408 is selected in the sponsorship dashboard 402, an updated sponsorship dashboard 602 can be displayed showing available sponsors for vehicles that may be in a game. It should be appreciated that although some games may not require a player to operate a vehicle or an avatar, but another device (for example, a floating and sentient calculator) or animal (for example, a fish, a bear, or the like), the sponsorship dashboard can be updated to include the different devices or animals. Also, in some embodiments, any device or animal would have its own advertisement placement locations associated with it. The advertisement placement locations can be programmed as to not interfere with gameplay. The sponsorship dashboard 602 shows a list of sponsors similar to the sponsorship dashboard 402 associated with the avatar tab 406. However, the list of sponsors is different, which can indicate that some sponsors prefer to only be listed on cars (for example, sponsors 7, 8 and 9), some sponsors find both the screen, cars, and avatars to be acceptable (for example, sponsors 2 and 5), and some sponsors prefer to only be on the screen or avatars (for example, sponsors 1, 3, 4, and 6). Also, in some embodiments, an interface may comprise a cockpit or other surroundings, and each surrounding can have sectioned areas for potential advertisement placement locations.

In FIG. 7, in the sponsorship dashboard 602, sponsor 5 624 is shown as being selected. Upon selection, a list of requirements 626 (for example, "Requirement 1" and "Requirement 2") is shown under sponsor 5 624. The list of requirements 626 can show the one or more requirements, or sponsorship criteria, associated with the sponsor (for example, sponsor 5 624). Some of the sponsorship criteria may be met and, in some embodiments, those criteria can be indicated as being met by the player accessing this interface. Further, it should be appreciated that although the advertisement placement locations (for example, 412, 414, 418, 420, and 422) are not shown in FIG. 7, and are instead shown on FIG. 6, in some embodiments, some or all of the advertisement placement locations can be shown on both or either interface.

Upon selection of a sponsor (for example, sponsor 5 624), the car customization screen 604 can be updated to show all advertisement placement locations (for example, 614, 616, 618, and 620) available based on the sponsorship settings, any player preferences, and/or. any game administrator. A player can then select an advertisement placement location 620 where the player desires to place the sponsor 5 624 advertisement. The car customization screen 604 can then be updated to display the image or content associated with the sponsor 5 624 advertisement as a preview of how the vehicle 606 will appear during gameplay. The car customization screen 604 also includes one or more vehicles (for example, 606) that can match any customizations provided by the player. For example, some cars can be shown only when unlocked or paid for. Also, for example, some cars can be customized with new paint or parts. The vehicle 606 can be spun around (for example, by selecting the vehicle 606 with a mouse or finger, if on a touchscreen device, and/or by interacting with the circular arrow 608. The vehicle 606 includes an advertisement placement location 620 on the side of the vehicle 606 that can be selected to place an advertisement associated with sponsor 5, as shown. The vehicle 606 can also include an advertisement placement location on the back, top of the trunk, top of the car, top of the hood, bottom, and each side of the vehicle, and allowing the avatar 426 to spin allows the player view all sides of the vehicle 606. Also, a player can select left arrow 610 and/or right arrow 612 to cycle through available vehicles that are available to the player.

In some embodiments, the advertisements associated with the sponsors can vary based on the advertisement placement location selected. For example, a player can select sponsor 5 624 from the sponsorship dashboard, then the player can select advertisement placement location 420 to view one advertisement image, and advertisement placement location 616 to view a different advertisement image. Having multiple types of images can be desirable in some embodiments so that advertisement placement locations with more or less screen space can optimize the type of advertisement displayed. Additionally, in some embodiments, a player, a sponsor, or a game administrator of the sponsor matching system can permit or forbid certain advertisements from appearing in certain advertisement placement locations as well. For example, advertisement placement locations available or advertisements available for particular advertisement placement locations can be programmed as to not interfere with gameplay.

A player can select minimize button 436 to hide the sponsorship dashboard 602 and view the car customization screen 604 in full screen. Also, in some embodiments, upon selection of the minimize button 436, the car customization screen 604 can hide all advertisement placement locations that have not been selected (for example, 614, 616, and 618).

Once a sponsor and advertisement placement location are selected (for example, sponsor 5 620 and the advertisement placement location that is on the side of the vehicle 606), a player can either selected cancel or apply to either revert to the prior settings or apply the changes, respectively.

Interface for Gameplay after Player Selection of Sponsorship Advertisements

FIG. 8 shows an example interface 500 during gameplay for a player device, according to one embodiment. The gameplay interface 504 can be shown with the toolbar 530, which can be similar or the same as toolbar 430 in FIG. 6. FIG. 8 incorporates the selections from FIG. 6 (selecting sponsor 3 and advertisement placement location that is at the top of the example gameplay interface 404 and second from the right) and the selections from FIG. 7 (sponsor 5 and the advertisement placement location that is on the side of the vehicle). The vehicle 502 shows the sponsor 5 advertisement in the same location 506 as selected. Also, the gameplay interface 504 shows the sponsor 3 advertisement in the same location 414 as selected as well. The avatar 426 is also shown as operating the vehicle 502. It should be appreciated that although the player selected the sponsor 5 advertisement placement location in FIG. 7 based on vehicle 606, the selection can persist to other vehicles (for example, vehicle 502). Also, depending on the game or player, one example why a sponsor may choose to omit certain selections is because the advertisement placement location may not be displayed in a format the sponsor desires. For example, a player a sponsor desires to advertise for may solely play racing modes in a game and the sponsor may choose to omit avatar advertisement placement locations from being selected by a player since the location would be covered most if not all the time while racing.

Example Hardware Configuration of Player System

Figure 9:
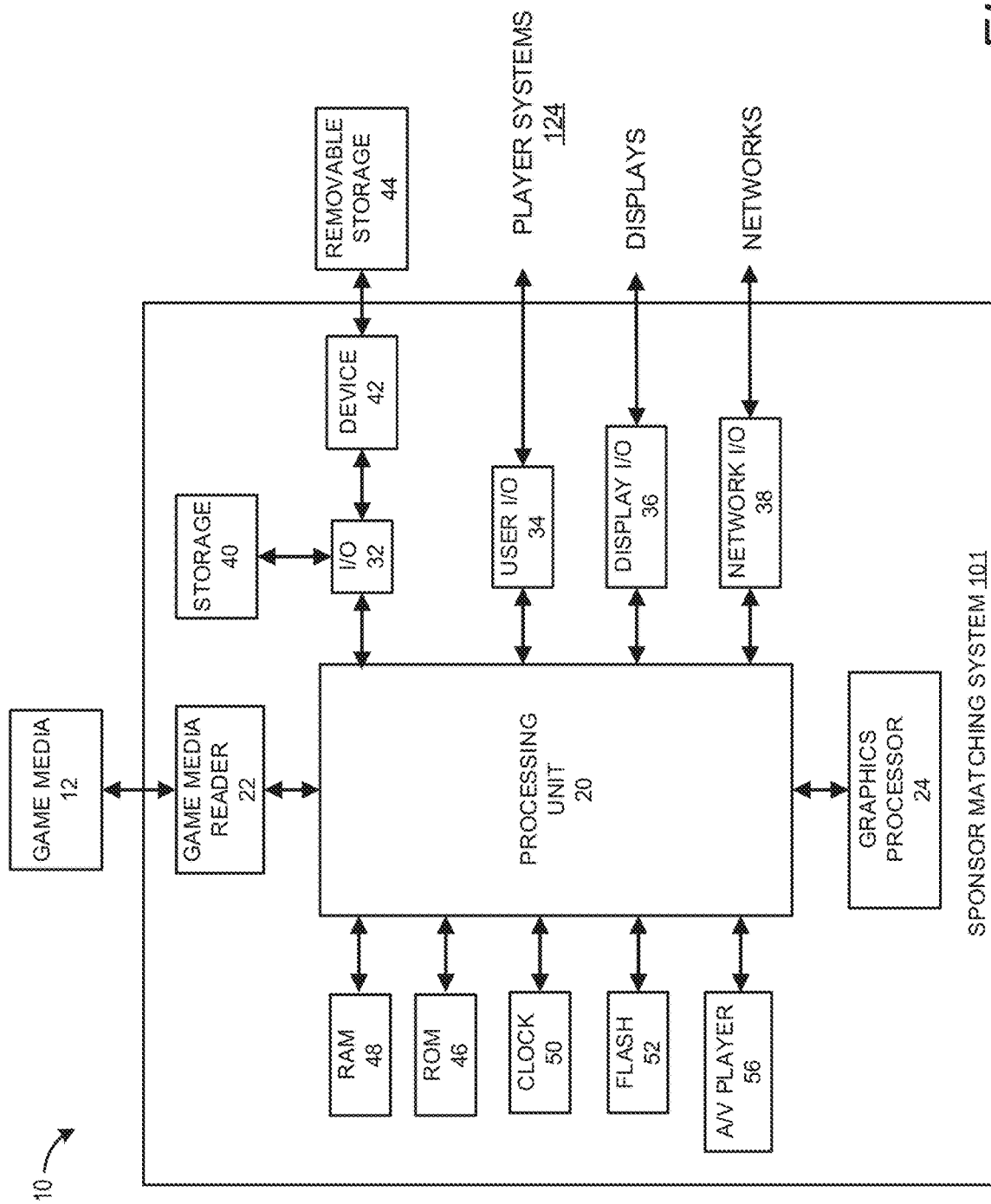
FIG. 9 illustrates an embodiment of a hardware configuration for the player system.

FIG. 9 illustrates an embodiment of a hardware configuration for the player system 102 described herein. Other variations of the player system 102 may be substituted for the examples explicitly presented herein, such as removing or adding components to the player system 102. The player system 102 may include a dedicated game device, a smart phone, a tablet, a personal computer, a desktop, a laptop, a smart television, a car console display, and the like.

As shown in system configuration 10, the player system 102 includes a processing unit 20 that interacts with other components of the player system 102 and also components external to the player system 102. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The player system 102 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the player system 102 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The player system 102 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 800. Processing unit 20 can communicate through I/O 32 to store data, such as game state data and any shared data files. In addition to storage 40 and removable storage media 44, computing device 800 is also shown including ROM (Read-Only Memory) 46 and RAM 48. RAM 48 may be used for data that is accessed frequently, such as when a game is being played.

User I/O 34 is used to send and receive commands between processing unit 20 and player systems, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. The player system 102 may comprise one or more integrated displays configured to receive display output signals produced by the display I/O 36, which may be output for display to a user. According to some embodiments, display output signals produced by the display I/O 36 may also be output to one or more display devices external to the computing device 800.

The player system 102 can also include other features that may be used with a game, such as a clock 50, flash memory 52, and other components. An audio/video player 56 might also be used to play a video sequence, such as a movie. It should be understood that other components may be provided in the player system 102 and that a person skilled in the art will appreciate other variations of the player system 102.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the player system 102 is turned off or loses power.

As player system 102 reads game media 12 and provides a game, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Example Game Engine/Frame Rendering Process

Figure 10:
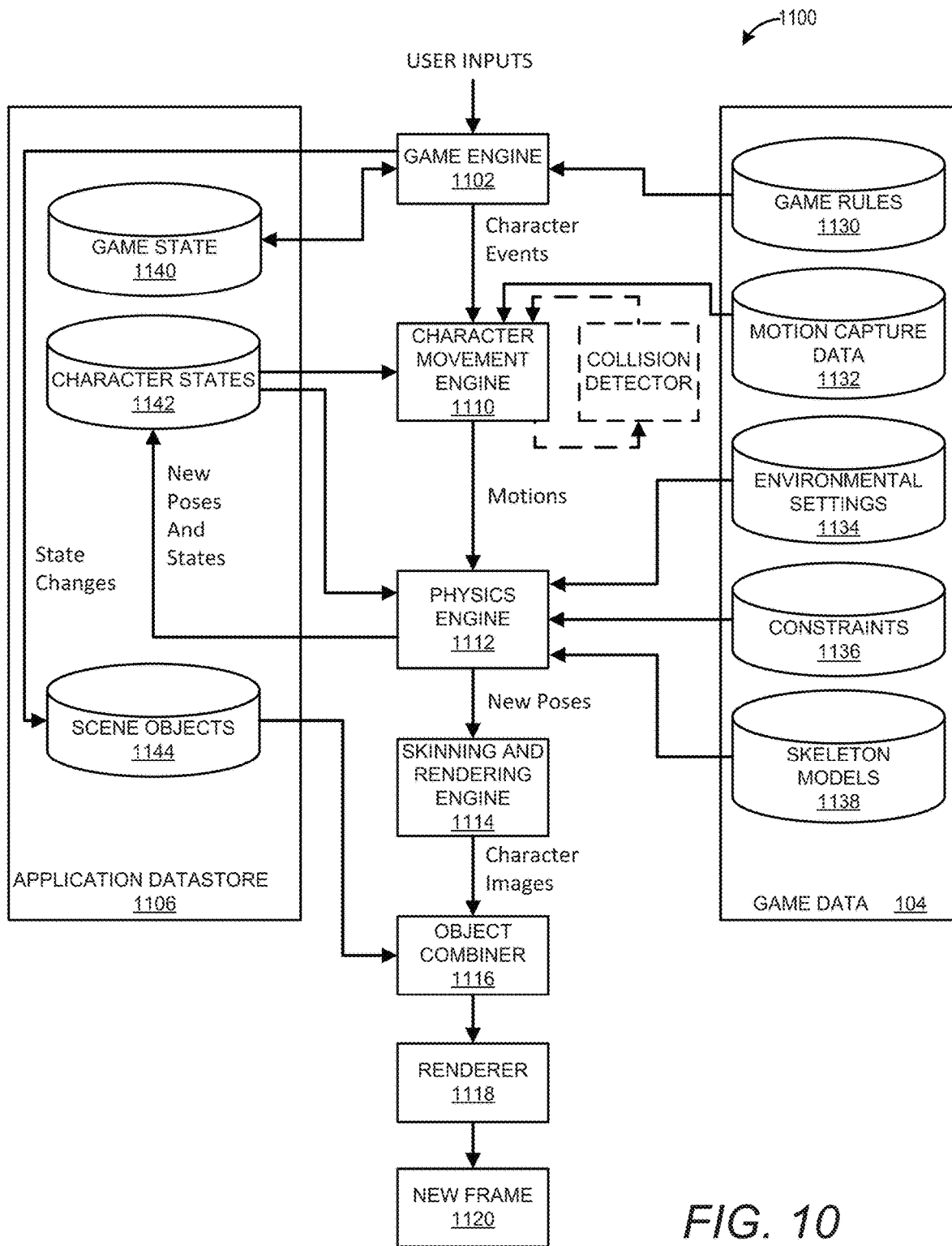
FIG. 10 illustrates an embodiment of elements of a game system.

FIG. 10 illustrates an embodiment of some elements of a game system, especially those involved in execution of gameplay within a game application 108 of FIG. 1B. A game device provides for user input to control aspects of the game according to game rules 1130. Game rules 1130 might be specified in instruction form on game media 12 from FIG. 9. Examples of game rules 1130 include rules for scoring, possible inputs, actions/events, movement in response to inputs, and the like. Other components can control what inputs are accepted and how the game progresses, and other aspects of gameplay. The elements in FIG. 10 illustrate elements used for generating and rendering animation within the game based on various inputs.

As shown in FIG. 10, by system 1100, user inputs and game code/data may be used to generate display video. The game system also handles playing the game and presenting corresponding audio output. The description of FIG. 10 is focused on generating frames of display video for the game. A game engine 1102 receives the user inputs and determines character events, such as actions, collisions, runs, throws, attacks and other events appropriate for the game.

The character events are conveyed to a character movement engine 1110 that determines the appropriate motions the characters should make in response to the events and passes those motions on to a physics engine 1112. Physics engine 1112 determines new poses for the characters and provides those new poses to a skinning and rendering engine 1114. Engine 1114 in turn provides character images to an object combiner 1116 to combine animate, inanimate and background objects into a full scene. The full scene is conveyed to a renderer 1118, which generates a new frame 1440 therefrom.

Game code/data 1104 is shown comprising game rules 1130, prerecorded motion capture poses/paths 1132, environmental settings 1134, constraints 1136 (such as strength and velocity constraints), and skeleton models 1138. The device executing the game might have memory 1106 for game state 1140, character states 1142 and scene object storage 1144. Character states 1142 can comprise storage for a current pose of characters being animated.

During operation, the game engine 1102 reads in game rules 1130 and considers game state 1140 to arrive at character events. Character movement engine 1110 reads in prerecorded poses/paths 1132 as well as character states 1142. An optional collision detector process can derive the desired motions for characters based on collisions. Motions might be expressed as a set of external forces, target poses and the like. As needed, character movement engine 1110 may also use other data elements shown, such as skeleton models 1138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 1110 might also introduce character movements for randomness, personality, and so forth.

The physics engine 1112 has as its inputs the skeleton models of various characters, environmental settings 1134, character states such as current poses (for example, positions of body parts expressed as positions, joint angles or other specifications), and velocities (linear and/or angular) of body parts and motions provided by character movement engine 1110, which can be in the form of a set of force/torque vectors for some or all body parts. From this information, physics engine 1112 generates new poses for the characters using rules of physics and those new poses can be used to update character states 1142 and are also provided to rendering engine 1114. Where invisible skeleton models are used, character states 1142 might contain current position of visible "graphics" of characters as well as the invisible rag-doll skeleton characters.

The skinning and rendering engine 1114 takes into account the surfaces, colors and textures of the body parts of posed characters and renders character images. Object combiner 1116 can then combine the character images with inanimate and background objects obtained from scene objects store 1114 to provide a complete scene to renderer 1118.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A sponsor matching system comprising:
   one or more data stores configured to store computer-executable instructions;
   a network interface configured to communicate over a network; and
   one or more physical computer processors in communication with the one or more data stores, wherein the computer-executable instructions, when executed, configure the one or more physical computer processors to:
      execute an instance of an online game during runtime of a gameplay session, wherein the execution of the instance of the online game includes performing operations in the instance in response to commands received over the network via the network interface and from a player computing systems;
      generate game state information that is transmitted to the player computing systems over the network via the network interface, wherein the game state information facilitates presentation of a virtual environment of the online game to players via the player computing systems;
      receive, via the network interface from the player computing systems, player data;
      receive, via the network interface from a first sponsor, a sponsorship request that includes sponsorship criteria;
      apply a sponsorship and player matching model to the player data based at least in part on the sponsorship criteria, wherein the sponsorship and player matching model identifies a first subset of players that satisfies the sponsorship criteria;
      select a first player of the first subset of players to receive sponsorship data corresponding to sponsorship of the first player by the first sponsor, wherein the sponsorship data includes virtual sponsorship content identifying the first sponsor;
      receive, via the network interface from the player computing systems, a first indication of a selection of the first sponsor and the virtual sponsorship content; and
      transmit, via the network interface, updated sponsorship data to a first player computing system associated with the first player, wherein the updated sponsorship data is based at least in part on the first indication such that the instance of the online game is rendered with the virtual sponsorship content within the virtual environment during runtime of the gameplay session.

2. The system of claim 1, wherein the virtual sponsorship content includes advertisement customizations that are based at least in part on the one or more placement location options for the first sponsor.

3. The system of claim 1, wherein the one or more placement location options includes one or more locations on an interface, or locations on a character or an object to be rendered on the interface that is also controlled by the first player, during gameplay within the game application.

4. The system of claim 1, wherein the one or more physical computer processors are further configured to:

receive feedback data from one or more of: a sponsor system, a player system, and an administrator of the sponsor matching system; and update the sponsorship and player matching model that can be used to match sponsors with players based at least in part on any sponsorship criteria and any player data.

5. The system of claim 1, wherein the one or more physical computer processors are further configured to:

receive updated player data from the first player system; and apply the sponsorship and player matching model to the updated player data based on the sponsorship criteria to:

determine a second subset of players based at least in part on the sponsorship criteria and the updated player data.

6. The system of claim 1, wherein the one or more physical computer processors are further configured to: determine a second subset of players comprising a recommended set of players based at least in part on the sponsorship criteria and the player data, wherein the second subset of players is flagged for a secondary approval by the first sponsor.

7. The system of claim 5, wherein the one or more physical computer processors are further configured to:

receive, from the first sponsor, updated sponsorship criteria; and wherein the sponsorship criteria includes updated sponsorship criteria.

8. The system of claim 1, where the sponsorship and player matching model is a supervised machine learning algorithm.

9. The system of claim 1, wherein the player data includes player preferences associated with the players.

10. The system of claim 1, wherein the one or more physical computer processors are further configured to: automatically approve the players in the first subset of players to receive the sponsorship data associated with the first sponsor.

11. The system of claim 1, wherein the one or more physical computer processors are further configured to:

transmit, to the first sponsor, a request for approval of the first subset players accounts to receive the sponsorship data; and receive, from the sponsor system, selected player information indicating a selection of players from the first subset of player accounts to receive the sponsorship data.

12. A computer implemented method comprising:

by one or more physical computer processors in communication with the one or more data stores, executing an instance of an online game during runtime of a gameplay session, wherein the execution of the instance of the online game includes performing operations in the instance in response to commands received from a player computing systems;

generating game state information that is transmitted to the player computing systems, wherein the game state information facilitates presentation of a virtual environment of the online game to players via the player computing systems;

receiving, from the player computing systems, player data;

receiving, from a first sponsor, a sponsorship request that includes sponsorship criteria;

applying a sponsorship and player matching model to the player data based at least in part on the sponsorship criteria, wherein the sponsorship and player matching model identifies a first subset of players that satisfies the sponsorship criteria;

selecting a first player of the first subset of players to receive sponsorship data corresponding to sponsorship of the first player by the first sponsor, wherein the sponsorship data includes virtual sponsorship content identifying the first sponsor;

receiving, via the network interface from the player computing systems, a first indication of a selection of the first sponsor and the virtual sponsorship content; and transmitting, via the network interface, updated sponsorship data to a first player computing system associated with the first player, wherein the updated sponsorship data is based at least in part on the first indication such that the instance of the online game is rendered with the virtual sponsorship content within the virtual environment during runtime of the gameplay session.

13. The method of claim 12, wherein the virtual sponsorship content includes advertisement customizations that are based at least in part on the one or more placement location options for the first sponsor.

14. The method of claim 12, wherein the one or more placement location options includes one or more locations on an interface, or locations on a character or an object to be rendered on the interface that is also controlled by the first player, during gameplay within the game application.

15. The method of claim 12 further comprising:

receiving feedback data from one or more of: a sponsor system, a player system, and an administrator of the sponsor matching system; and updating the sponsorship and player matching model that can be used to match sponsors with players based at least in part on any sponsorship criteria and any player data.

16. The sponsor matching system of claim 1, wherein the sponsorship criteria includes rules that define usage restrictions on how the virtual sponsorship content is displayed or used by the player within the virtual environment during runtime of the gameplay session.

17. The sponsor matching system of claim 16, wherein the sponsorship criteria includes one or more of: an identification of games or types of games, a player ranking threshold, average playtime threshold, social media statistic thresholds, and game streaming statistic thresholds, player grouping categories.

18. The sponsor matching system of claim 16, wherein the one or more physical computer processors are further configured to:

in response to a determination that the first player computing system renders the instance of the online game with the virtual sponsorship content, facilitate the distribution of a reward to the first player computer system.

19. The sponsor matching system of claim 16, wherein the first indication further includes a selection of a first placement location of the one or more placement location options.

20. The sponsor matching system of claim 16, wherein the network includes the internet.

* * * * *